(12) United States Patent
Lablans

(10) Patent No.: US 7,002,490 B2
(45) Date of Patent: *Feb. 21, 2006

(54) TERNARY AND HIGHER MULTI-VALUE DIGITAL SCRAMBLERS/DESCRAMBLERS

(75) Inventor: Peter Lablans, Morris Township, NJ (US)

(73) Assignee: Ternarylogic LLC, Morristown, NJ (US)

(*) Notice: Subject to any disclaimer, the term of this patent is extended or adjusted under 35 U.S.C. 154(b) by 100 days.

This patent is subject to a terminal disclaimer.

(21) Appl. No.: 10/936,181

(22) Filed: Sep. 8, 2004

(65) Prior Publication Data

US 2005/0084111 A1 Apr. 21, 2005

Related U.S. Application Data

(63) Continuation of application No. 10/912,954, filed on Aug. 6, 2004.
(60) Provisional application No. 60/501,335, filed on Sep. 9, 2003.

(51) Int. Cl.
*H03M 1/22* (2006.01)

(52) U.S. Cl. ............................................. 341/10; 341/50
(58) Field of Classification Search ................... 341/50, 341/51, 57, 56, 10; 365/49, 189.7, 168; 381/41, 381/38, 35; 395/2.28
See application file for complete search history.

(56) References Cited

U.S. PATENT DOCUMENTS

| | | | |
|---|---|---|---|
| 3,129,340 A | 4/1964 | Baskin | |
| 3,142,037 A | 7/1964 | Gazale | |
| 3,210,529 A | 10/1965 | Hanson | |
| 3,283,256 A | 11/1966 | Hurowiz | |
| 3,492,496 A | 1/1970 | Callan | |
| 3,515,805 A | 6/1970 | Fracassi et al. | |
| 3,586,022 A | 6/1971 | Bauer | |
| 3,649,915 A | 3/1972 | Mildonian | |
| 3,656,117 A | 4/1972 | Maley et al. | |
| 3,660,678 A | 5/1972 | Maley et al. | |
| 3,663,837 A | 5/1972 | Epstein et al. | |

(Continued)

OTHER PUBLICATIONS

Peter Lablans, The Logic of More, "http://ternarylogic.home.att.net", made available on Internet Mar. 20, 2003.
Peter Lablans, The Logic of More, "http://ternarylogic.home.att.net", made available on Internet Sep. 3, 2003.

(Continued)

*Primary Examiner*—Brian Young
(74) *Attorney, Agent, or Firm*—Glen M. Diehl; Norton & Diehl LLC

(57) ABSTRACT

Ternary (3-value) and higher, multi-value digital scramblers/descramblers in digital communications. The method and apparatus of the present invention includes the creation of ternary (3-value) and higher value truth tables that establish ternary and higher value scrambling functions which are its own descrambling functions. The invention directly codes by scrambling ternary and higher-value digital signals and directly decodes by descrambling with the same function. A disclosed application of the invention is the creation of composite ternary and higher-value scrambling devices and methods consisting of single scrambling devices or functions combined with ternary or higher value shift registers. Another disclosed application is the creation of ternary and higher-value spread spectrum digital signals. Another disclosed application is a composite ternary or higher value scrambling system, comprising an odd number of scrambling functions and the ability to be its own descrambler.

50 Claims, 18 Drawing Sheets

U.S. PATENT DOCUMENTS

| | | | |
|---|---|---|---|
| 3,671,764 A | 6/1972 | Maley et al. | |
| 3,718,863 A | 2/1973 | Fletcher et al. | |
| 3,760,277 A | 9/1973 | Whang | |
| 3,988,538 A | 10/1976 | Patten | |
| 3,988,676 A | 10/1976 | Whang | |
| 4,304,962 A | 12/1981 | Fracassi et al. | |
| 4,378,595 A | 3/1983 | Current | |
| 4,383,322 A | 5/1983 | Halpern et al. | |
| 4,775,984 A | 10/1988 | Jaffre et al. | |
| 4,808,854 A | 2/1989 | Reinagel | |
| 4,815,130 A | 3/1989 | Lee | |
| 4,984,192 A | 1/1991 | Flynn | |
| 4,990,796 A | 2/1991 | Olson | |
| 5,017,817 A | 5/1991 | Yamakawa | |
| 5,230,003 A | 7/1993 | Dent et al. | |
| 5,412,687 A | 5/1995 | Sutton et al. | |
| 5,457,783 A * | 10/1995 | Chhatwal | 704/219 |
| 5,563,530 A | 10/1996 | Frazier | |
| 5,621,580 A | 4/1997 | Cruz et al. | |
| 5,714,892 A | 2/1998 | Bowers et al. | |
| 5,724,383 A | 3/1998 | Gold et al. | |
| 5,761,239 A | 6/1998 | Gold et al. | |
| 5,790,265 A | 8/1998 | Shikakura | |
| 5,790,591 A | 8/1998 | Gold et al. | |
| 5,856,980 A | 1/1999 | Doyle | |
| 5,917,914 A | 6/1999 | Shaw et al. | |
| 5,959,871 A | 9/1999 | Pierzchala et al. | |
| 5,978,412 A | 11/1999 | Takai | |
| 5,999,542 A | 12/1999 | Turner et al. | |
| 6,122,376 A | 9/2000 | Rao | |
| 6,133,753 A | 10/2000 | Thomson et al. | |
| 6,133,754 A | 10/2000 | Olson | |
| 6,192,257 B1 | 2/2001 | Ray | |
| 6,288,922 B1 * | 9/2001 | Wong et al. | 365/49 |
| 6,320,897 B1 | 11/2001 | Fattouche et al. | |
| 6,452,958 B1 | 9/2002 | van Nee | |
| 6,477,205 B1 | 11/2002 | Doblar et al. | |
| 6,519,275 B1 | 2/2003 | Callaway et al. | |
| 2002/0089364 A1 | 7/2002 | Goldgeisser et al. | |
| 2003/0072449 A1 | 4/2003 | Myszne | |
| 2003/0099359 A1 | 5/2003 | Hui | |
| 2003/0165184 A1 | 9/2003 | Welborn et al. | |
| 2004/0021829 A1 | 2/2004 | Griffin | |
| 2004/0032918 A1 | 2/2004 | Shor | |
| 2004/0032949 A1 | 2/2004 | Forest | |
| 2004/0037108 A1 | 2/2004 | Notani | |
| 2004/0042702 A1 | 3/2004 | Akimoto | |
| 2004/0068164 A1 | 4/2004 | Diab et al. | |
| 2004/0085937 A1 | 5/2004 | Noda | |
| 2004/0091106 A1 | 5/2004 | Moore et al. | |

OTHER PUBLICATIONS

Peter Lablans, Index and Introduction, The Logic of More, "http://www.ternarylogic.com", made available on Internet Jun. 17, 2004.

Peter Lablans, 8, More about multi-value scramblers and reversible logic, The Logic of More, "http://www.ternarylogic.com", made available on Internet Jan. 2, 2004.

Peter Lablans, 11. Generating pseudo ternary and m–ary sequences, The Logic of More, "http://www.ternarylogic.com", made available on Internet Dec. 2, 2003.

Peter Lablans, 14. The lingering question: how to transform from binary to ternary logic?, The Logic of More, "http://www.ternarylogic.com", available on Internet Nov. 15, 2003.

Peter Lablans, 15. Expressing ternary scrambling/descrambling in binary logic, The Logic of More, "http://www.ternarylogic.com", available on Internet Dec. 8, 2003.

Peter Lablans, 16. Links to other Multi–value Logic Sites, The Logic of More, "http://www.ternarylogic.com", available on Internet Nov. 18, 2003.

Peter Lablans; 17. XOR designated as Subtraction, not Addition; The Logic of More; "http://www.ternarylogic.com"; available on Internet Dec. 6, 2003.

Peter Lablans; 18. Adequate set of ternary connectives for commutative functions; The Logic of More; "http://www.ternarylogic.com"; available on Internet Jan. 1, 2004.

Peter Lablans; 19. Creating individual states in ternary functions with a universal inverter; The Logic of More; "http://www.ternarylogic.com"; available on Internet Jan. 1, 2004.

Peter Lablans; 20. The Logic of More; The Logic of More; "http://www.ternarylogic.com"; available on Internet Nov. 18, 2003.

Peter Lablans; 21. Modified modulo–n subtraction scramblers; The Logic of More; "http://www.ternarylogic.com"; available on Internet Jan. 15, 2004.

Peter Lablans; 22. LFSR scramblers, GF(n) and n–value m–sequences; The Logic of More; "http://www.ternarylogic.com"; available on Internet Jan. 15, 2004.

Peter Lablans; 23. Involution, scramblers and n–value logic; The Logic of More; "http://www.ternarylogic.com"; available on Internet Jan. 24, 2004.

Peter Lablans; 24. Involution aspects of LFSR based ternary scramblers; The Logic of More; "http://www.ternarylogic.com"; available on Internet Jan. 25, 2004.

Peter Lablans; 25. Ternary and n–value sequence generators and correlation properties; The Logic of More; "http://www.ternarylogic.com"; available on Internet Mar. 3, 2004.

Peter Lablans; 26. Ternary Gold–like sequence generators; The Logic of More; "http://www.ternarylogic.com"; available on Internet Apr. 12, 2004.

Peter Lablans; 27. Quaternary m–sequence and Gold–like sequence generators; The Logic of More; "http://www.ternarylogic.com"; available on Internet Apr. 14, 2004.

Deavours, et al., Machine Cryptography and Modern Crytpanalysis, 181–182, Artech House, Inc. 1985, no month.

* cited by examiner

|     | B |   |   |   |
| --- | - | - | - | - |
| fs1 | 0 | 1 | 2 | 3 |
| 0   | 0 | 3 | 2 | 1 |
| 1   | 3 | 2 | 1 | 0 |
| 2   | 2 | 1 | 0 | 3 |
| 3   | 1 | 0 | 3 | 2 |

A (row label)

If C → A fs1 B
then
A → C fs1 B
B → A fs1 C

|     | B |   |   |   |
| --- | - | - | - | - |
| fs2 | 0 | 1 | 2 | 3 |
| 0   | 1 | 0 | 3 | 2 |
| 1   | 0 | 3 | 2 | 1 |
| 2   | 3 | 2 | 1 | 0 |
| 3   | 2 | 1 | 0 | 3 |

If C → A fs2 B
then
A → C fs2 B
B → A fs2 C

|     | B |   |   |   |
| --- | - | - | - | - |
| fs3 | 0 | 1 | 2 | 3 |
| 0   | 2 | 1 | 0 | 3 |
| 1   | 1 | 0 | 3 | 2 |
| 2   | 0 | 3 | 2 | 1 |
| 3   | 3 | 2 | 1 | 0 |

If C → A fs3 B
then
A → C fs3 B
B → A fs3 C

|     | B |   |   |   |
| --- | - | - | - | - |
| fs4 | 0 | 1 | 2 | 3 |
| 0   | 3 | 2 | 1 | 0 |
| 1   | 2 | 1 | 0 | 3 |
| 2   | 1 | 0 | 3 | 2 |
| 3   | 0 | 3 | 2 | 1 |

If C → A fs4 B
then
A → C fs4 B
B → A fs4 C signal         a = 3102

Sequence    n = 012033210312 sequence   Res = 32130012302110312230120321023301231003201 1230132

TERNARY AND HIGHER MULTI-VALUE DIGITAL SCRAMBLERS/DESCRAMBLERS

STATEMENT OF RELATED CASES

This application is a continuation of U.S. patent application Ser. No. 10/912,954, filed on Aug. 6, 2004 is still pending, which claims the benefit of Provisional Patent Application No. 60/501,335, filed Sep. 9, 2003.

BACKGROUND OF THE INVENTION

The present invention relates to telecommunications of digital signals. In particular, the present invention relates to coding a digital signal and decoding of the coded digital signal without error and loss of information.

Digital coding is applied widely for the transmission of signals over optical, cable, radio connections and other transmission media. Coding is applied to transmitted signals for several reasons. For example, coding helps retain the quality of the digitally coded signal after transmission. It can also hide the content of the coded message or signal. Coding can also protect the coded message against interference or jamming, and can increase the capacity of the transmission medium to allow the medium to handle a greater number of messages or signals.

More particularly, the present invention relates to the area of ternary and higher, multi-value digital scrambling methods and apparatus as well as descrambling methods and apparatus. The method and apparatus of the present invention which applies methods that generate digital sequences which are the coded form of digital message to be transmitted or which form a substantial basis for creating coded messages.

Typical digital transmission systems have transmitters and receivers. The original message to be transmitted can be any type of signal, such as voice, video, text or any other data format. The signal is digitized, coded and then modulated to be transmitted over the transmission medium. At the receiving end, the signal is demodulated, decoded and then applied to some device to re-constitute the original message format.

The digitized message has been generally represented in binary (or 2-value) format. This means that the signal provided to the coder is a binary signal and the signal provided to the decoder is also a binary signal.

There are different ways to implement binary coding and decoding. In the prior art, a well established way to code a binary message is by applying a binary scrambler. A binary scrambler is an electronic device or an executed method that has as its input a series or sequence of binary digits, which will be guided through a finite length shift register or a computer program that acts as such. The content of pre-established cells of the shift register will be tapped and connected to an element that will conduct a specific binary operation on two binary elements. In the prior art, this operation is overwhelmingly Modulo-2 addition. The result of the Modulo-2 addition can be fed back into the shift register, fed into a next Modulo-2 addition or being sent to the modulation stage of the transmission.

If the input to a binary scrambler is a sequence of binary digits, the output of a binary scrambler is also a series or sequence of binary digits. The input and output of a scrambler are in general and preferably dissimilar. The dissimilarity of the input and the output sequences depends on the input sequence, the length of the shift register, the number and place of taps and applied Modulo-2 add operations and initial content of the shift register.

The descrambler has as its input the output of the scrambler. The descrambler reverses the operation of the scrambler and can recover, without mistakes, the original uncoded digital message that formed the input to the scrambler.

The common element in all binary scramblers and descramblers are the binary Modulo-2 additions. The binary logical operation is also known under its binary logic designation: Exclusive OR or XOR or ≠.

Scramblers and descramblers are currently binary methods or devices that are composed of binary XOR functions. Binary XOR functions have the property of Modulo-2 addition. Modulo-2 addition is identical to Modulo-2 subtraction. In general, a binary signal is scrambled by adding it to another known binary signal under Modulo-2 rules. The original binary signal can be recovered from the scrambled signal by Modulo-2 subtraction of the known binary signal from the scrambled signal. Because Modulo-2 addition and Modulo-2 subtraction are both represented by the binary logic XOR function, binary scrambling and descrambling take place by the same binary logic function. While Modulo-2 addition is identical to Modulo-2 subtraction, that identity is not true for Modulo-3 and higher Modulo-n addition and subtraction. It is apparent to the inventor that the more fundamental description of identical scrambling/descrambling functions is that two binary inputs A and B generate a binary output C. If A and C are the inputs to the function, the output B is generated. Or if B and C are the inputs to the function, A is generated as the output. Binary scrambling functions can also be applied in binary Direct Sequence Spread Spectrum coding where an initial binary digital sequence is combined with a secondary, binary sequence with substantially more digits through a binary scrambling function.

In many cases it would be beneficial, either to the performance, quality or capacity of the telecommunication system to transmit modulated digital signals that represent higher value digits. For instance a cable system may transmit 3-value or ternary signals to balance the Direct Current component of the signals in the transmission system. These ternary signals can assume one of three states. The use of multi-value (greater than 2) signals also can increase the capacity (in information rate, or number of users) of a communication system. Nevertheless, many systems limit themselves to operating in a binary fashion. This is because of the availability and pervasiveness of binary technology and the lack of ternary and higher multi-value methods and technologies.

The availability of ternary (or 3-value) methods (even if executed in binary fashion) would greatly improve the performance of digital systems. Signal coding is an example of an area that would be greatly improved by the use of ternary or multi-value scrambling techniques. Also, as higher value scramblers have a greater number of scrambling functions, the application of ternary and higher value scramblers can make a spread-spectrum signal much harder to decode for un-authorized users and equipment. Application of ternary and higher-value scramblers can substantially improve the performance, capacity and security of digital communication systems.

In these respects and in others, the ternary and multi-value scrambling methods according to the present invention substantially depart from the conventional concepts, and provide a method primarily developed to conduct ternary and multi-value scrambling and descrambling of digital signals.

SUMMARY OF THE INVENTION

In accordance with one aspect of the present invention, method and apparatus for scrambling a ternary signal with a scrambler is provided. The ternary signal is able to assume one of three states. The scrambler has a first scrambling ternary logic device that implements a ternary logic function, sc, and a scrambling logic circuit.

In accordance with one aspect of a method of the present invention, an unknown ternary signal is input to a first input of the scrambling ternary logic device. A known ternary signal is input to a second input of the scrambling ternary logic device.

The scrambling ternary logic device implements a ternary logic function, sc, that satisfies the following equations: (1) A sc B=C, where A is the unknown signal, B is the known ternary signal and C is the output from the ternary logic device; (2) C sc B=A, if C and B were input to the ternary logic device; and (3) A sc C=B; if A and C were input to the ternary logic device.

A scrambled ternary signal is provided from an output of the scrambling ternary logic device.

In accordance with another aspect of the present invention, the ternary logic function is defined by one of the following truth tables:

|     | In2 |   |   |
| --- | --- | - | - |
| In1 | 0   | 1 | 2 |
| 0   | 0   | 2 | 1 |
| 1   | 2   | 1 | 0 |
| 2   | 1   | 0 | 2 |

|     | In2 |   |   |
| --- | --- | - | - |
| In1 | 0   | 1 | 2 |
| 0   | 1   | 0 | 2 |
| 1   | 0   | 2 | 1 |
| 2   | 2   | 1 | 0 |

|     | In2 |   |   |
| --- | --- | - | - |
| In1 | 0   | 1 | 2 |
| 0   | 2   | 1 | 0 |
| 1   | 1   | 0 | 2 |
| 2   | 0   | 2 | 1 |

In accordance with another aspect of the present invention, a method of descrambling a ternary signal is provided. In accordance with one aspect of the method of the present invention, the scrambled ternary signal is input to a first input of a descrambling ternary logic device. The known ternary signal is input to a second input of the descrambling ternary logic device. The descrambling ternary logic device implements a ternary logic function, sc. The unknown ternary signal is provided on an output of the descrambling ternary logic device.

The descrambling logic device implements a ternary logic function that satisfies the same equations previously set forth. Additionally, the ternary logic device is preferably defined by one of the three truth tables previously set forth.

In accordance with another aspect of the present invention, apparatus for scrambling an unknown ternary signal with a known ternary signal is provided. The apparatus includes a scrambling ternary logic device having a first input, a second input and an output. The unknown ternary signal is connected to the first input of the scrambling ternary logic device. The known ternary signal is connected to the second input of the scrambling ternary logic device.

The scrambling ternary logic device implements a ternary logic function, sc, that satisfies the equations previously set forth: (1) A sc B=C, where A is the unknown signal, B is the known ternary signal and C is the output from the ternary logic device; (2) C sc B=A, if C and B were input to the ternary logic device; and (3) A sc C=B; if A and C were input to the ternary logic device.

A scrambled ternary signal is provided on the output of the scrambling ternary logic device.

The ternary logic function, sc, is defined by one of the three truth tables previously set forth.

In accordance with another aspect of the present invention, apparatus to descramble a ternary signal is provided. The apparatus includes a descrambling ternary logic device having a first input, a second input and an output. The apparatus includes a descrambling ternary logic device. The scrambled ternary signal that was scrambled by the scrambled apparatus previously described is input to the first input. The known ternary signal is input to the second input of the descrambling ternary logic device. The unknown ternary signal that was scrambled by the scrambling apparatus is recovered and output by the descrambling ternary logic device.

The method and apparatus of the present invention applies to higher level multi-value signals. These signals can also be referred to as x-value signals that can assume one of x values, where x is greater than or equal to 3.

The method and apparatus for scrambling x-value signals where x is greater than or equal to 4 is similar to those method and apparatus previously described. For example, a four-value signal is scrambled and descrambled with a scrambling and descrambling logic device that implements a logic function that is defined by the previously described equations: (1) A sc B=C, where A is the unknown signal, B is the known x-value signal and C is the input from the x-value logic device; (2) C sc B=A, if C and B were input to the x-value logic device; and (3) A sc C=B; if A and C were input to the x-value logic device.

Further, in the case of a four-value signal, the 4-value logic function is defined by one of the following truth tables

|     | In2 |   |   |   |
| --- | --- | - | - | - |
| In1 | 0   | 1 | 2 | 3 |
| 0   | 0   | 3 | 2 | 1 |
| 1   | 3   | 2 | 1 | 0 |
| 2   | 2   | 1 | 0 | 3 |
| 3   | 1   | 0 | 3 | 2 |

|     | In2 |   |   |   |
| --- | --- | - | - | - |
| In1 | 0   | 1 | 2 | 3 |
| 0   | 1   | 0 | 3 | 2 |
| 1   | 0   | 3 | 2 | 1 |

-continued

| In1 | In2 | | | |
|-----|-----|---|---|---|
|     | 0   | 1 | 2 | 3 |
| 2   | 3   | 2 | 1 | 0 |
| 3   | 2   | 1 | 0 | 3 |

| In1 | In2 | | | |
|-----|-----|---|---|---|
|     | 0   | 1 | 2 | 3 |
| 0   | 2   | 1 | 0 | 3 |
| 1   | 1   | 0 | 3 | 2 |
| 2   | 0   | 3 | 2 | 1 |
| 3   | 3   | 2 | 1 | 0 |

| In1 | In2 | | | |
|-----|-----|---|---|---|
|     | 0   | 1 | 2 | 3 |
| 0   | 3   | 2 | 1 | 0 |
| 1   | 2   | 1 | 0 | 3 |
| 2   | 1   | 0 | 3 | 2 |
| 3   | 0   | 3 | 2 | 1 |

In accordance with another aspect of the present invention, method and apparatus for scrambling and descrambling an x-value signal, including a ternary signal, is provided. In accordance with one aspect of the method, the unknown x-value signal is input to a first of a first scrambling x-value logic device and a first known x-value signal is input to a second input of the first scrambling x-value logic device.

An output from the first scrambling x-value logic device is input to a first input of a second scrambling logic device and a second known x-value signal to a second input of the second scrambling x-value logic device.

An output from the second scrambling x-value logic device is input to a first input of a third scrambling logic device and a second known x-value signal to a second input of the third scrambling x-value logic device.

The first, second and third scrambling x-value logic device implement a x-value logic function, fc, that satisfies the previously described equations: (1) A sc B=C, where A is the signal on the first input of the device, B is the second input of the device and C is the output from the device; (2) C sc B=A, if C and B were input to the device; and (3) A sc C=B; if A and C were input to the device.

A scrambled x-value signal is provided on an output of the third scrambling x-value logic device.

In accordance with another aspect of the present invention, a descrambler is provided. The descrambling system corresponds to the scrambling system.

It is noted that the truth tables set forth above are extendable to cases where multi-value signals that can assume five or more values are being scrambled and descrambled. The generic n-value logic function is defined by the following truth table and by variations thereof:

| In1 | In2 | | | | | | | |
|-----|-----|-----|-----|-----|-----|-----|-----|-----|
|     | 0   | 1   | 2   | 3   | ... | ... | n-2 | n-1 |
| 0   | 0   | n-1 | n-2 | ... | ... | ... | 2   | 1   |
| 1   | n-1 | n-2 | n-3 | ... | ... | ... | 1   | 0   |
| 2   | n-2 | n-3 | n-4 | ... | ... | ... | 0   | n-1 |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| n-2 | 2   | 1   | 0   | ... | ... | ... | 4   | 3   |
| n-1 | 1   | 0   | n-1 | ... | ... | ... | 3   | 2   |

Notwithstanding the fact that for ternary and x-value scrambling systems comprising an odd number of scrambling devices with ternary or x-value logic functions here described, the corresponding descrambling systems are identical to the scrambling systems, each x-value scrambling system comprising an odd or even number of x-value scrambling functions here described has as its descrambler a system comprising the same devices as in its corresponding scrambling system, but arranged in the reverse order.

DESCRIPTION OF THE DRAWINGS

Notwithstanding the fact that for ternary and x-value scrambling systems comprising an odd number of scrambling devices with ternary or x-value logic functions here described, the corresponding descrambling systems are identical to the scrambling systems, each x-value scrambling system comprising an odd or even number of x-value scrambling functions here described has as its descrambler a system comprising the same devices as in its corresponding scrambling system, but arranged in the reverse order.

Various other objects, features and advantages of the present invention will become fully appreciated as the same becomes better understood when considered in conjunction with the accompanying drawings, wherein.

DESCRIPTION OF THE INVENTION

Figure 1:
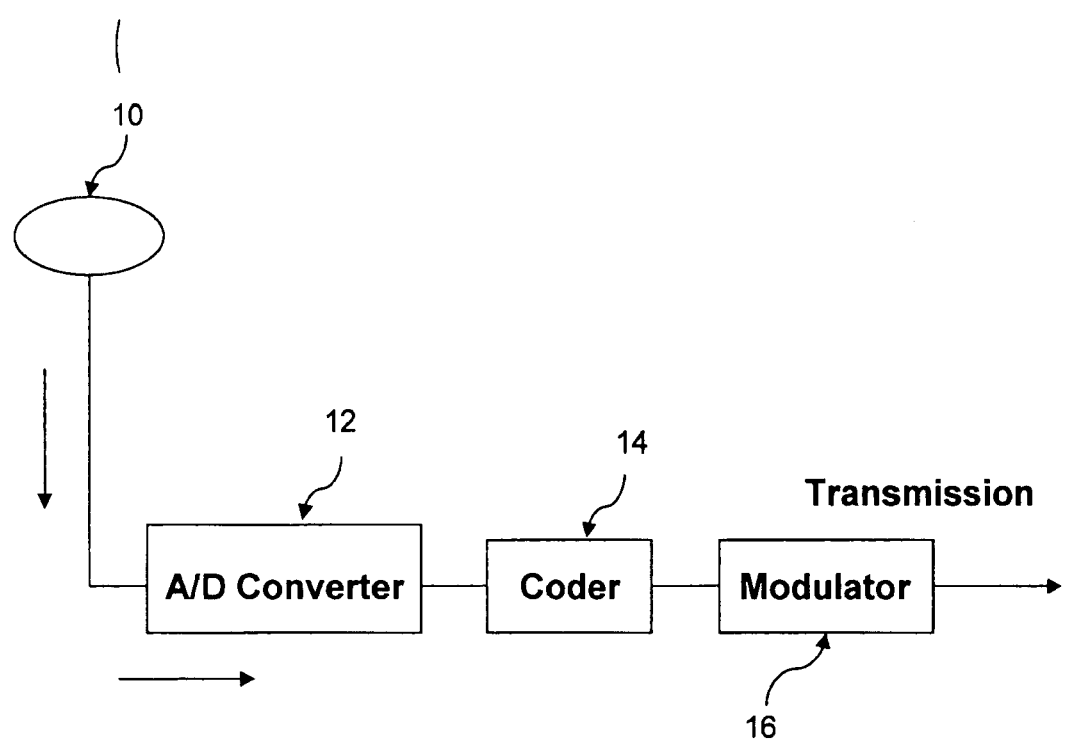
FIG. 1 illustrates a block diagram of the sending side of a digital communication system describing the general position of a coder.

FIG. 1 illustrates a digital transmission system. The input signal 10 can be from a variety of information sources, such as voice, video, graphics or data. The signal is converted to digital form by A/D converter 12. Typically, the signal is coded by a coder 14. The signal is modulated by a modulator 16 and then transmitted.

Figure 2:
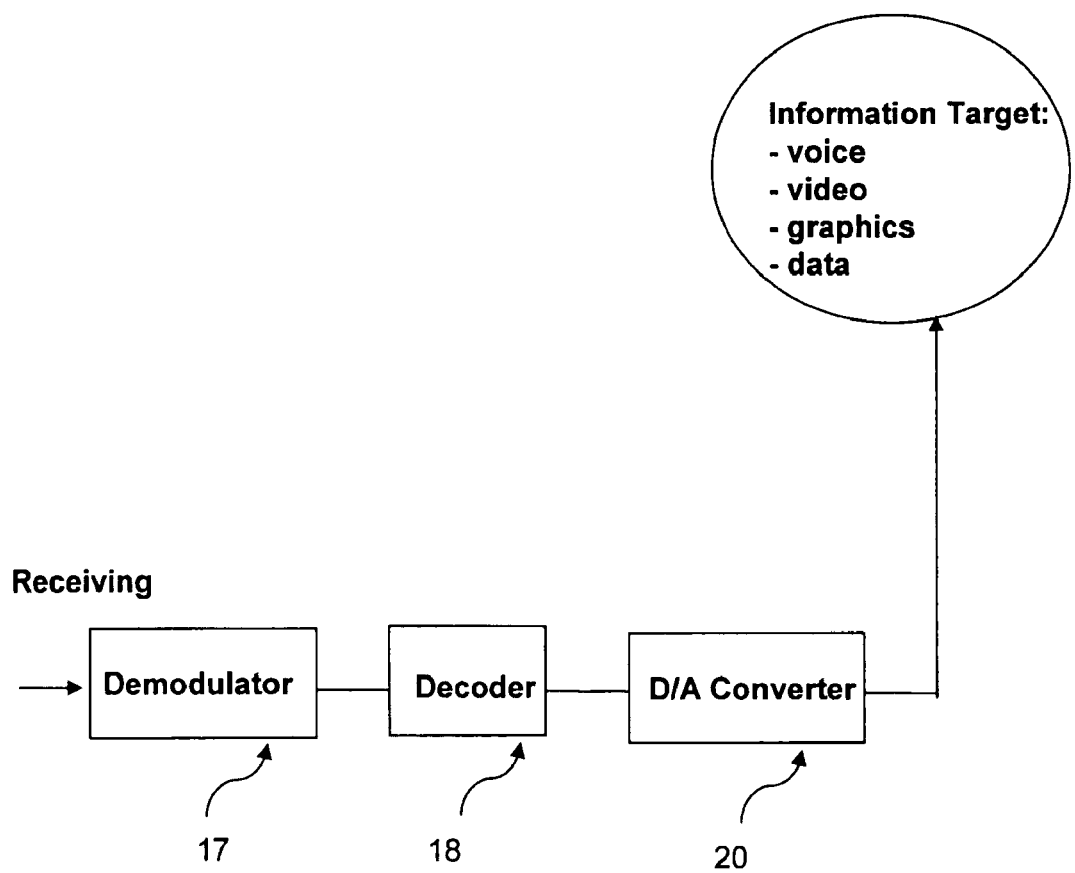
FIG. 2 is a block diagram of the receiving side of a digital communication system describing the general position of a decoder.

FIG. 2 illustrates a digital receiving system. The signal transmitted by the transmission system is received and demodulated by a demodulator 17. The signal is decoded by a decoder 18. The signal can then be converted by a D/A converter 20.

Figure 3:
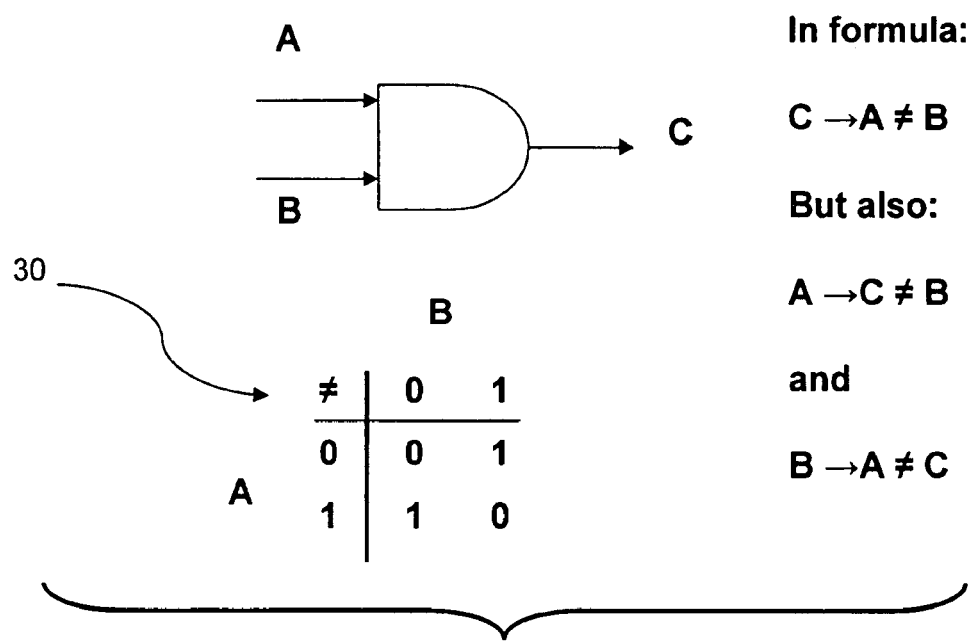
FIG. 3 is a diagram and truth table of binary scrambling function.

FIG. 3 illustrates a known binary scrambling function that is typically used to scramble signals in a binary scrambling system. The binary scrambling function is known as the exclusive Or function. It is also known as the modulo-2 adder. This function is also used in binary descrambling.

The state table for the binary scrambling function is illustrated at 30. This state table is the exclusive (XOR) function.

Figure 4:
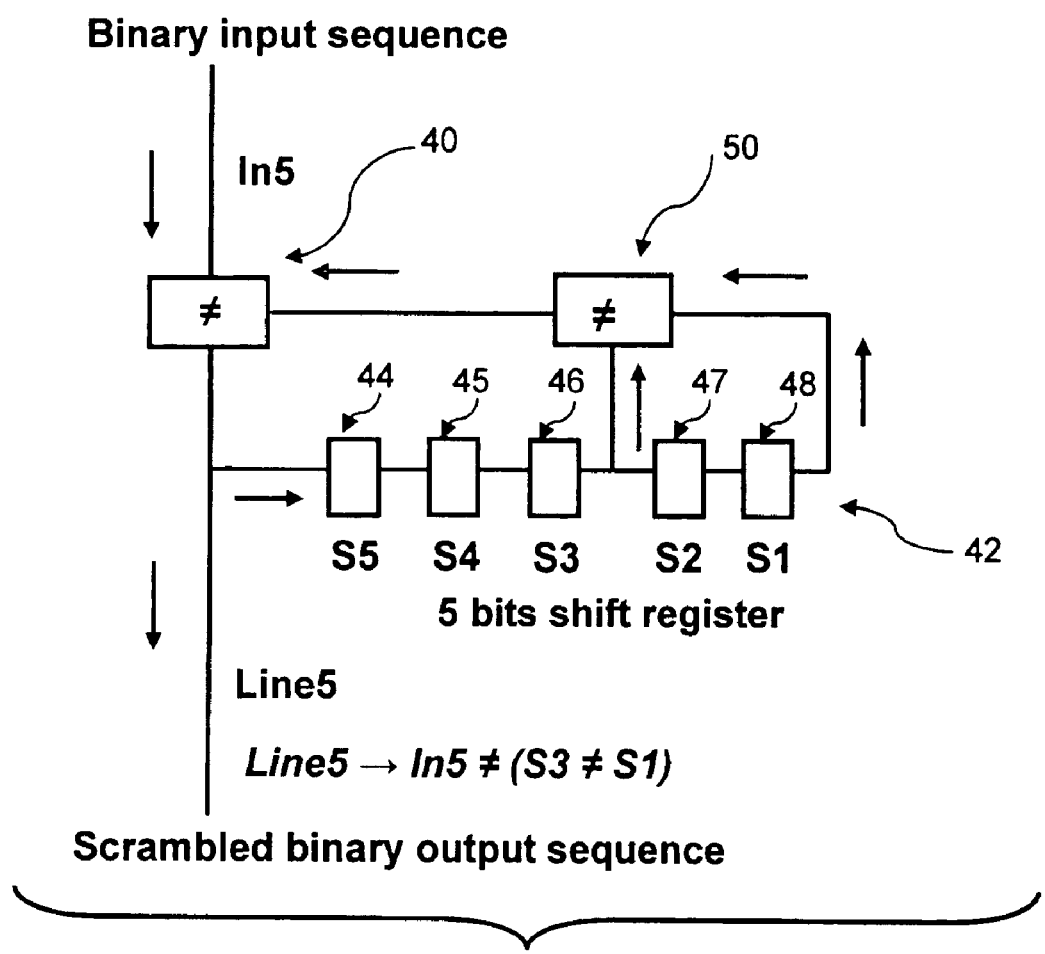
FIG. 4 illustrates a known application of a binary scrambler consisting of a binary shift register and binary Exclusive Or functions.
Figure 5:
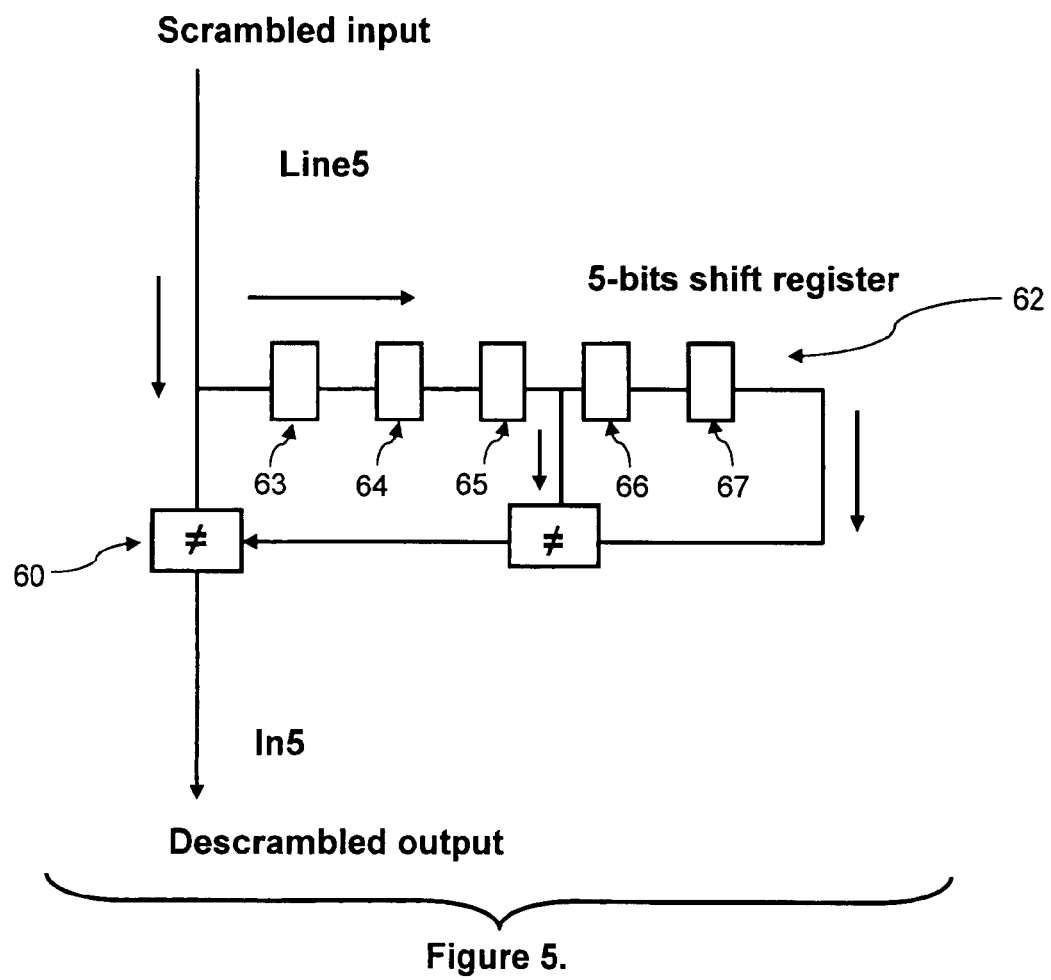
FIG. 5 illustrates a known application of a binary descrambler consisting of a binary shift register and binary Exclusive Or functions that can recover the original signal from a scrambled binary sequence.

In digital communications, the coder 14 often performs scrambling functions and the decoder often performs a corresponding descrambling function. The scrambling is performed for a variety of reasons, as previously discussed. FIG. 4 illustrates a known binary scrambler and FIG. 5 illustrates a known binary descrambler. In FIG. 4, a binary sequence is input to the XOR device 40. An output from the XOR device 40 is provided to a n-length shift register 42. In the case of FIG. 4, n is equal to five, so there are five elements 44 to 48 in the n-length shift register 42. Two outputs from the n-length shift register 42 are provided to a second XOR device 50. The outputs from the n-length shift register 42 are from the final element 48 and from an intermediate element 46. The output from the second XOR device 50 is provided to the first XOR device 40. A scrambled signal is provided at the output of the first XOR device 40 on Line 5.

FIG. 5 illustrates the descrambler that corresponds to the scrambler of FIG. 4. Thus, the descrambler of FIG. 5 can be used to descramble the signal scrambled by the system of FIG. 4. The scrambled signal is input on Line 5 to a first XOR device 60 and to a descrambling n-length shift register 62. In the case of FIG. 5, n is equal to five, so there are five elements 63 to 67 in the shift register 62. The output from elements 64 and 66 are provided to a second XOR device 68. The output from the second XOR device 68 is provided to an input to the first XOR device 60. A descrambled signal is provided at the output of the first XOR device 68.

These binary scrambling and descrambling structures are known. The shift registers may have any number of elements. It is also known that the outputs from any of the intermediate elements from the shift register may be used or alternatively, only the output from the final stage can be used.

Today's systems, such as the ones illustrated in FIGS. 4 and 5, are binary systems, so that binary signals that can assume one of two values are processed. Binary systems have limitations when compared to ternary systems or multi-value systems that use signals that can assume one of three and one of many states, respectively. By way of example only, a ternary signal can hold more information than a binary signal, and therefore potentially provides a system with greater throughput.

In view of the limitations inherent in binary scrambling and descrambling now present in the prior art, the present invention provides a new method and apparatus to conduct ternary and multi-value scrambling and descrambling of ternary and multi-value signals.

There is currently no method that allows for the creation of scramblers and descramblers consisting of elements that would directly conduct higher value (3-value, 4-value, . . . m-value) scrambling functions that also act as descrambling functions. The general purpose of the invention is to provide a new method for scrambling and descrambling of ternary and multi-value signals that has many of the advantages of the binary scramblers mentioned heretofore.

Binary scrambling is often designated as Modulo-2 addition. Modulo-3, however, can not serve the purpose of a ternary scrambling/descrambling function. A different approach is needed.

Figure 6:
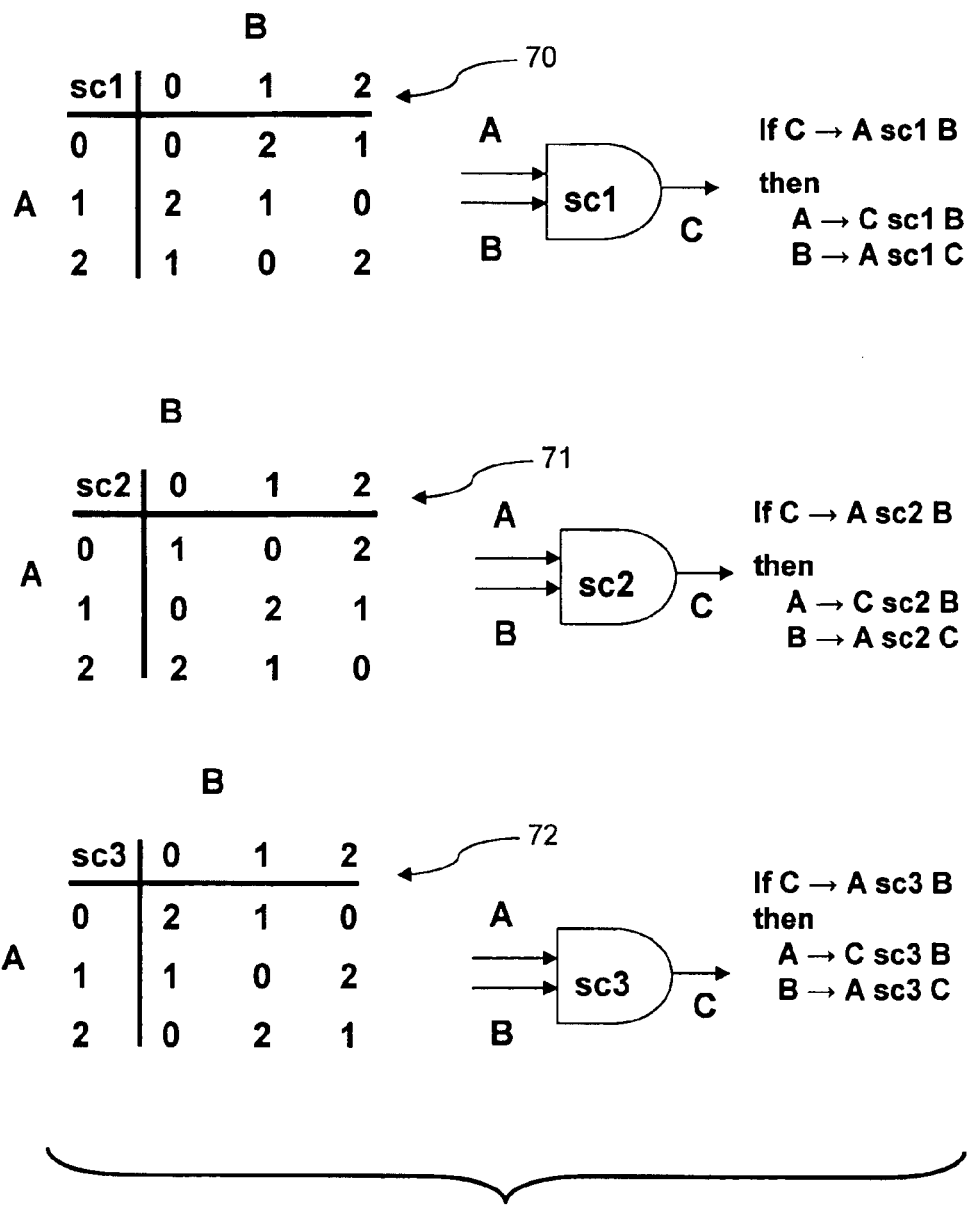
FIG. 6 illustrates a diagram illustrating the ternary scrambling and descrambling properties and apparatus of the present invention.
Figure 12:
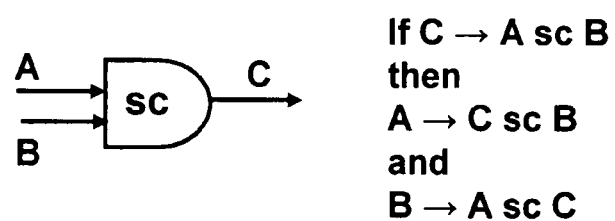
FIG. 12 is a diagram showing an embodiment of the n-value scrambling function of the present invention.
Figure 12:
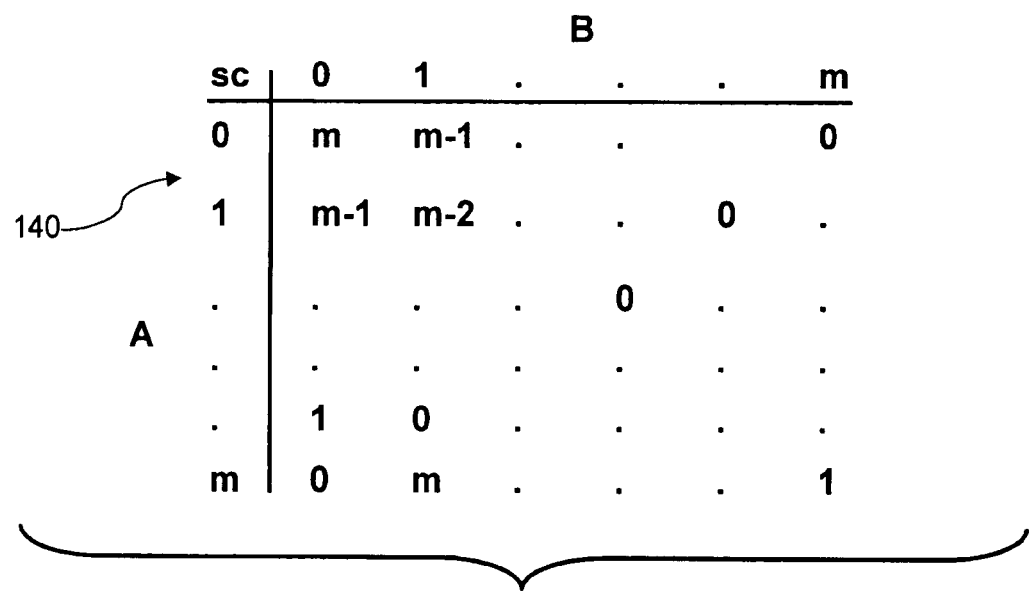

One aspect of the present invention is illustrated in FIG. 6. FIG. 6 illustrates three truth tables or logic tables that implement ternary logic functions that are useful in achieving an executable ternary or multi-value scrambling/descrambling function. The truth table shows as possible inputs A the most left column at the left side of the vertical line of the table and all possible inputs B as the upper row, on top of the horizontal line of the truth table. The value of output C is determined by the number found in the truth table at the intersecting virtual lines, drawn horizontally through a selected value of A and vertically through a selected value for B. In accordance with one aspect of the present invention, the truth tables illustrated in FIG. 6 are used to provide ternary scrambling as shown in FIG. 6 and for multi-value scrambling as shown in FIG. 12.

As illustrated in FIG. 6, each of the truth tables 70, 71 and 72 satisfies the equations:

(1) A sc B=C, where A and B are inputs to a ternary logic device implementing the function, sc, and C is an output from the ternary logic device;

(2) C sc B=A, if C and B where input to the ternary logic device; and (3) A sc C=B; if A and C were input to the ternary logic device; and Thus, the logic function associated with each truth table 70, 71 and 72 are designated sc1, sc2, and sc3, respectively. Each of the logic functions, however, satisfies the equations set forth above. Further, when sc is used, it is understood to designate any of the ternary logic functions sc1, sc2 or sc3.

Ternary and multi-value scrambling can be executed mechanically, electronically or optically. In digital communication systems scrambling is mainly executed electronically. The advantage of ternary and multi-value digital signals is in their better use of the transmission spectrum or bandwidth compared to binary signals. The actual processing of the numbers for scramblers and descramblers can take place in binary digital electronic systems.

Figure 7:
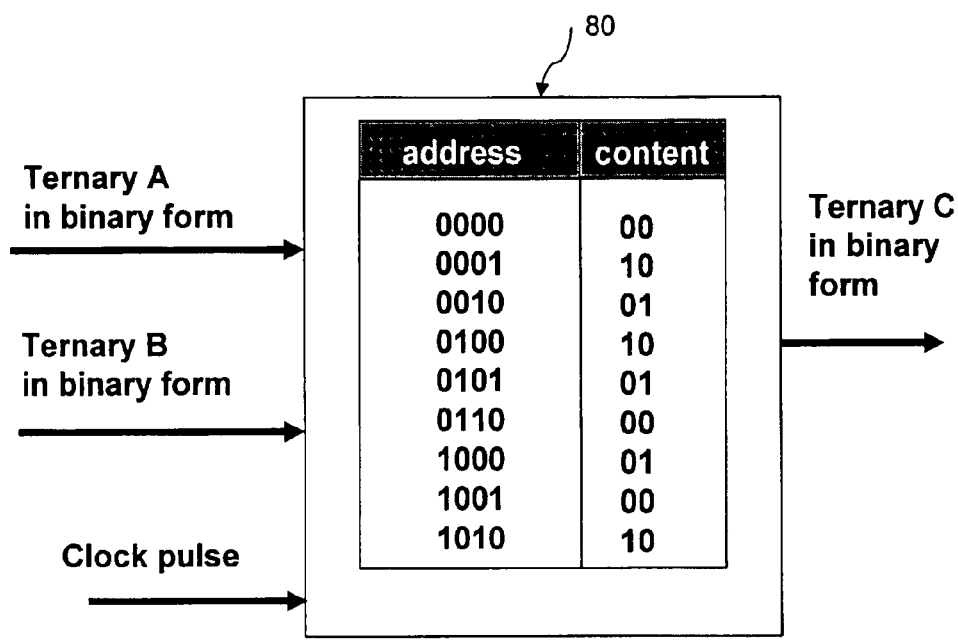
FIG. 7 illustrates a diagram showing an embodiment of a binary ROM of the present invention that can be used to achieve ternary scrambling properties of the present invention.

A dedicated ternary electronic scrambling system consisting of a digital Read Only Memory (ROM) circuit 80 is shown in FIG. 7. The inputs A and B to the scrambling truth table form combined an address to a memory location in the ROM circuit. Thus, the signal provided on A might form the first part of an address and the signal provided on B might form the second part of the address. The content of the memory location corresponds with the equivalent value at the corresponding ternary truth table. Thus, the output of the truth table, C, is provided at the output of the ROM 80. As such, any of the truth tables 70, 71 or 72 can be implemented by a ROM 80. For example, the truth table 82 is implemented by the ROM 80.

Figure 8:
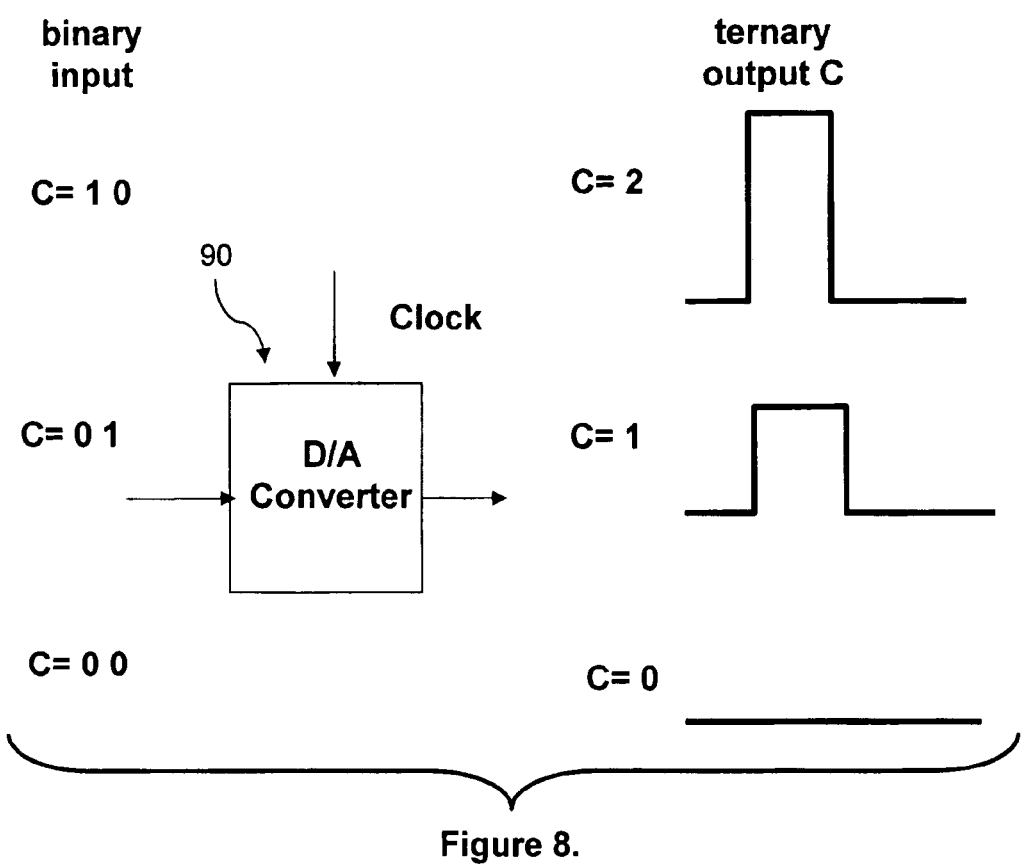
FIG. 8 is a diagram showing an embodiment of the present invention that can be used to generate scrambled ternary signals of the present invention.

A digital-to-analog converter, synchronized by an external clock, can generate the ternary or multi-value signal, as shown in FIG. 8. In FIG. 8, a binary input is provided to the D/A converter 90. The input signal can assume one of three binary values: 00 (or 0), 01 (or 1) and 10 (or 2). The D/A converter 90 converts the input signal to an analog signal, or a ternary signal, that can assume one of three values: 0, 1 and 2.

Figure 9:
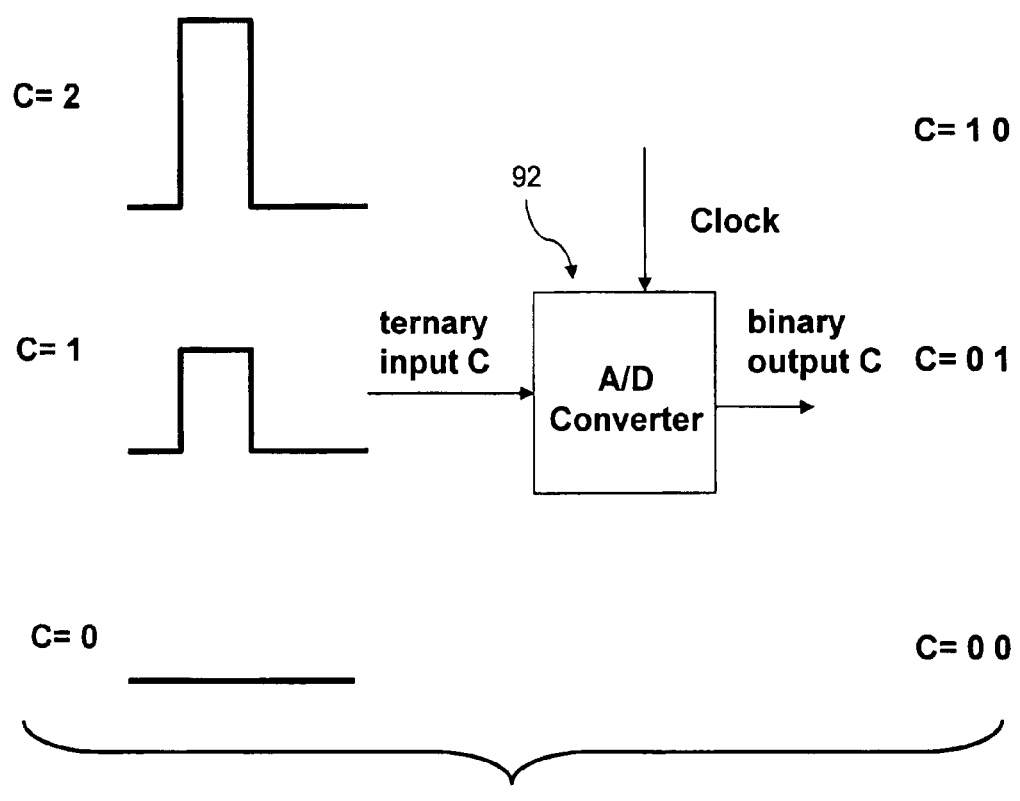
FIG. 9 is a diagram showing an embodiment of the present invention that can generate a binary representation of a signal from a ternary signal.

At the receiving side the incoming ternary or multi-value signal can be converted to binary representation by an analog-to-digital circuit, as shown in FIG. 9. In FIG. 9, the operation is the reverse as just describer with respect to FIG. 8. The incoming analog or ternary signal can assume one of three values: 0, 1 and 2. The A/D converter 92, outputs one of three binary signals: 00 (or 0), 01 (or 1) and 10 (or 2).

General programmable micro-processors or digital signal processors can also be programmed to execute the ternary or multi-value scrambling/descrambling methods.

It is an object of the present invention to provide a 3-value or ternary scrambling function or method and apparatus using a ternary logic device that implements one of a set of ternary logic functions. The ternary logic device has two inputs A and B and one output C. A, B and C each can have one out of three different values, for example, 0, 1 or 2. However, the general requirement for the values of A, B and C is that there are 3 distinct values that each A, B and C can assume and these values may symbolically be represented in a number of ways, such as by 0, 1, or 2 or by –, 0 and +.

Figure 10:
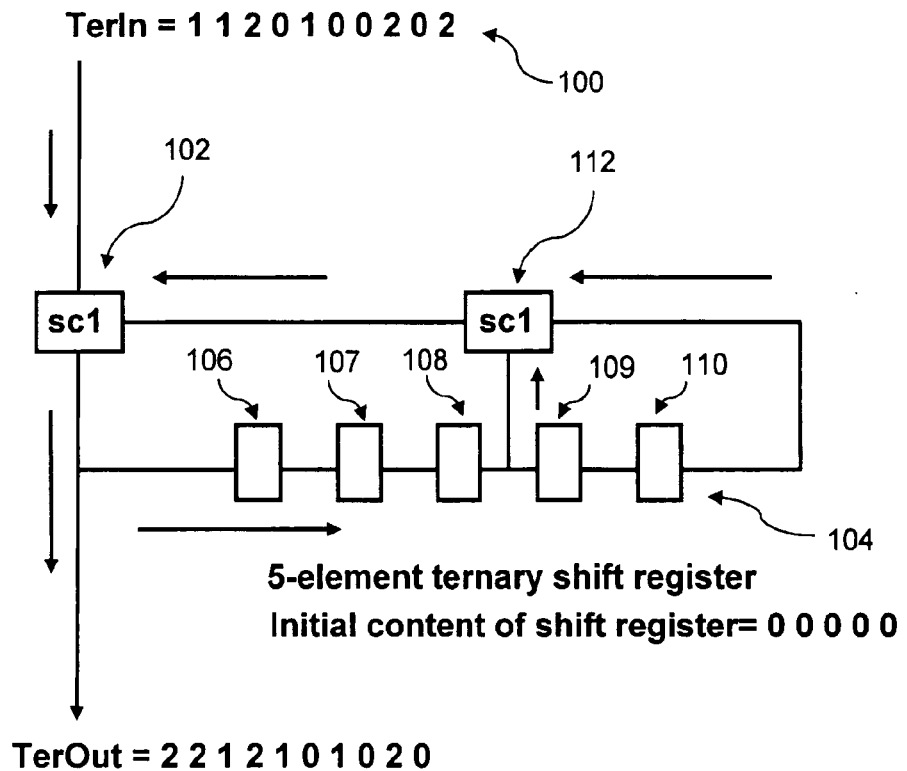
FIG. 10 is a diagram showing an embodiment of the present invention to scramble a ternary signal sequence.

FIG. 10 illustrates a ternary scrambler in accordance with one aspect of the present invention. A ternary signal 100 is provided on an input of a first ternary logic device 102. The first ternary logic device 102 provides an output to the input of an n-length shift register 104. The variable n may be any length, but in the case of FIG. 10 is illustrated as being five. Thus, there are five elements 106 to 110 in the shift register 104.

An output from the final element 110 of the shift register 104 and from an intermediate element 108 is provided to the inputs of a second ternary logic device 112. In FIG. 10, outputs from the third element 108 and the final element 110 are used, but one of ordinary skill in the art will appreciate that outputs from other elements (or taps) in the shift register 104 can also be used and that other configurations of the shift register and the logic devices can be used.

The output from the second ternary logic device 112 is provided to an input of the first ternary logic device 102. A scrambled ternary signal is provided at the output of the first ternary logic device 102.

In FIG. 10, the ternary input sequence is illustrated as 1 1 2 0 1 0 0 2 0 2. If the initial content of the shift register 104 is 0 0 0 0 0, then the scrambled output signal is 2 2 1 2 1 0 1 0 2 0. Of course, the final output depends on the initialization of the shift register 104.

Any of the ternary logic functions illustrated in FIG. 6 can be used to implement the first ternary logic device 102 and the second ternary logic device 112. As previously discussed, the method is such that ternary inputs A and B to the ternary logic function generate a ternary output C. The additional property of the logic function is that if the ternary inputs are C and A, the output is B. Further, if the ternary inputs are C and B, the ternary output from the logic function is A.

Figure 11:
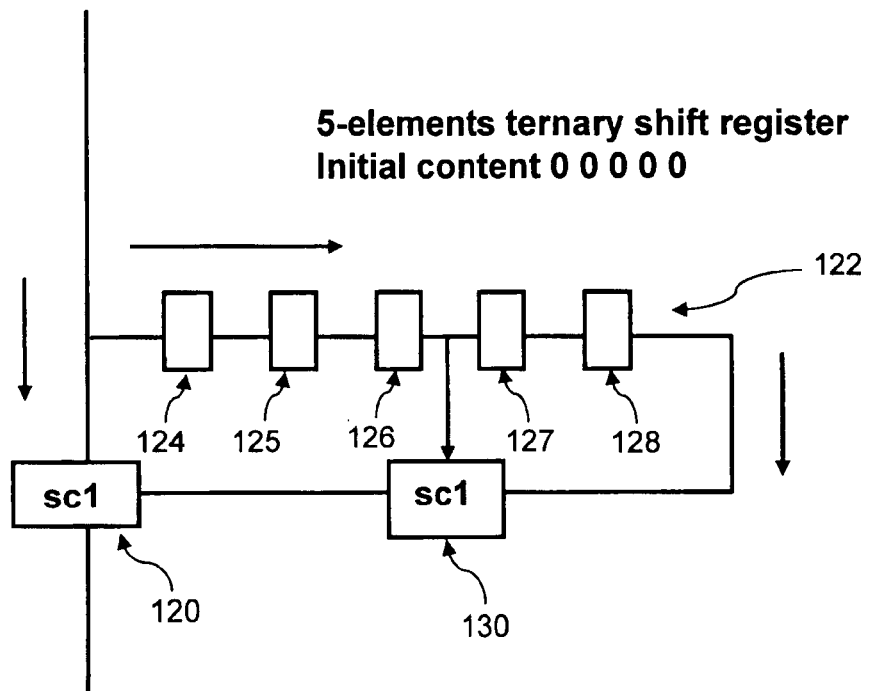
FIG. 11 is a diagram showing an embodiment of the present invention to descramble a scrambled ternary signal sequence.

In accordance with another aspect of the present invention, the scrambling function has the dual property of also performing the descrambling function. Thus, the ternary logic function used to scramble a ternary signal is also used to descramble the scrambled ternary signal. A descrambling circuit is illustrated in FIG. 11. The descrambling circuit corresponds to the scrambling circuit. Thus, if the scrambler has a five element shift register with an intermediate output being provided from the third element in the shift register, the descrambling circuit will have a corresponding structure. Thus, the descrambler will also have a five element shift register with an intermediate output being provided from the third element in the shift register. Similarly, if two ternary logic devices are used in the scrambler, then two ternary logic devices are used in the descrambler. Also, if a single ternary logic device is used in the scrambler, then a single ternary logic device is used in the descrambler.

Referring to FIG. 11, a scrambled ternary signal is input to a first ternary logic device 120 and to an n-length shift register 122. The n-length shift register 122 has five elements 124 to 128, the same number as in the shift register in the scrambler of FIG. 10. The output from the final element 128 and the output from the third element 126 of the n-length shift register are output to a second ternary logic device 130. The output from the second ternary logic device 130 is input to the first ternary logic device 120. A descrambled signal is provided at the output of the first ternary logic device 120.

FIG. 11 illustrates a scrambled ternary input sequence of 2 2 1 2 1 0 1 0 2 0 being input to the descrambler. Assuming that the shift register is initialized to 0 0 0 0 0, the descrambled ternary output is 1 1 2 0 1 0 0 2 0 2. This is the same ternary sequence that was input to the scrambler of FIG. 10.

The present invention is also applicable to multi-value signals that can assume one of x states wherein x is equal to or greater than four. In this case, as illustrated in FIG. 12, a multi-value logic function is used. A truth table 140 illustrates one of the available multi-value logic functions, sc, that can be used. For n-value logic, the value of m is n−1. Thus, if 4-value logic is used, m is equal to three. Once again, the truth table must satisfy the equations: (1) A sc B=C; (2) C sc B=A and (3) A sc C=B, where A and B are the inputs to a multi-value logic device and C is the output from the ternary logic device. As before, equations (2) and (3) are interpreted to be if B and C and A and C, respectively, were applied to a multi-value logic device.

As previously mentioned, there are truth tables other than the one 140 illustrated in FIG. 12 that can be used to implement a multi-value scrambler in accordance with the present invention. Other truth tables for applicable multi-value logic functions can be derived by moving the top p rows down a number p and the lower p rows are moved to the top of the truth table. Thus, for example, if p is equal to one, then the top row can be moved down one row and the bottom row can be moved to the top row. This process can be cycled through until duplicate truth tables are generated. In this way, n n-value commutative scrambling/descrambling logic functions can be generated.

The scrambling circuit and the descrambling circuit illustrated in FIGS. 10 and 11 can be used to implement multi-value signal scrambling and descrambling. The devices implementing the ternary logic functions that are illustrated in FIGS. 10 and 11 are simply replaced with the multi-value logic functions described in FIG. 12. The operation of the scrambler and descrambler circuits of FIGS. 10 and 11 are the same whether ternary or higher multi-value signals are being scrambled and descrambled.

Figure 13:
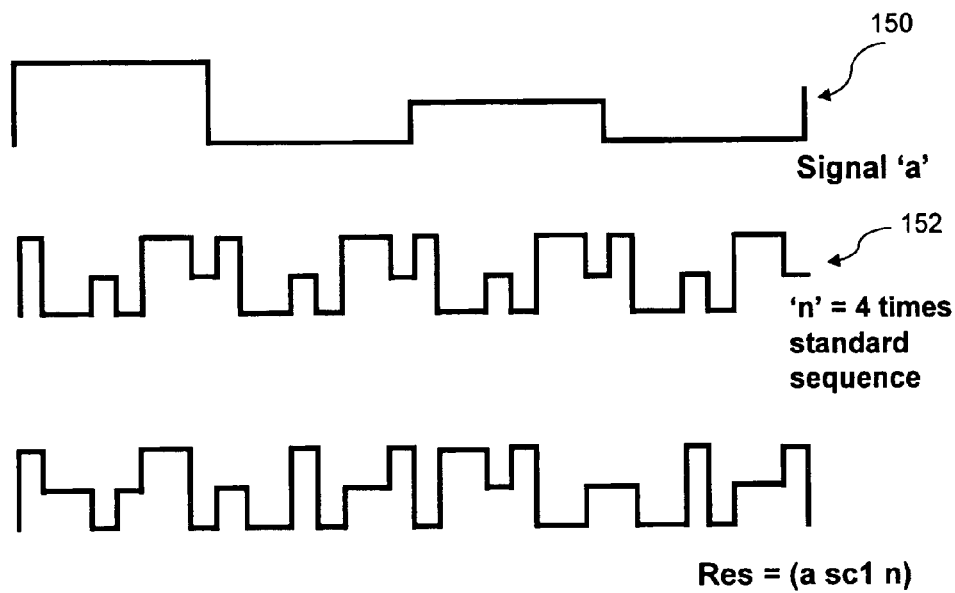
FIG. 13 is a diagram showing an embodiment of the present invention to generate a ternary spread spectrum signal sequence.

FIG. 13 illustrates another method of scrambling a ternary or a higher multi-value signal. In this method, the signal to be scrambled is provided to an input of a device that implements a ternary or multi-value logic function. Another known, pre-determined ternary or multi-value sequence is input to the other input of the device that implements a ternary or multi-value logic function. The device implements any of the logic functions described with respect to FIGS. 6 or 10. Once again, the logic function must satisfy the equations: (1) A sc B=C; (2) C sc B=A and (3) A sc C=B, as previously discussed.

Referring to FIG. 13, the ternary digital signal at line 150 is to be scrambled with a known sequence to create a ternary spread spectrum signal. The signal sequence is 2 0 1 0, and is provided to one input of the logic device. The known, pre-determined sequence that is applied to the other input of the logic device is illustrated on line 152. That sequence is 2 0 0 1 0 2 2 1. The known, pre-determined sequence has a higher clock frequency than the signal to be scrambled. In the case of FIG. 13, the frequency of the known, pre-determined signal is eight times faster than the frequency of the signal to be scrambled. It is easily seen that while the signal to be scrambled maintains a certain value or state during a finite time, the known sequence has eight states and achieves a spreading factor of 8.

A logic table illustrated at 154 is used in the example illustrated in FIG. 13 to scramble the signal. Thus, the logic device that the signal at line 150 and the signal at line 152 are applied to implements a logic function defined by the logic table 154. The scrambled signal can be recovered by applying the scrambled signal and the known, pre-determined sequence to a device that implements the same multi-value logic function that was used in the scrambling procedure.

Figure 14:
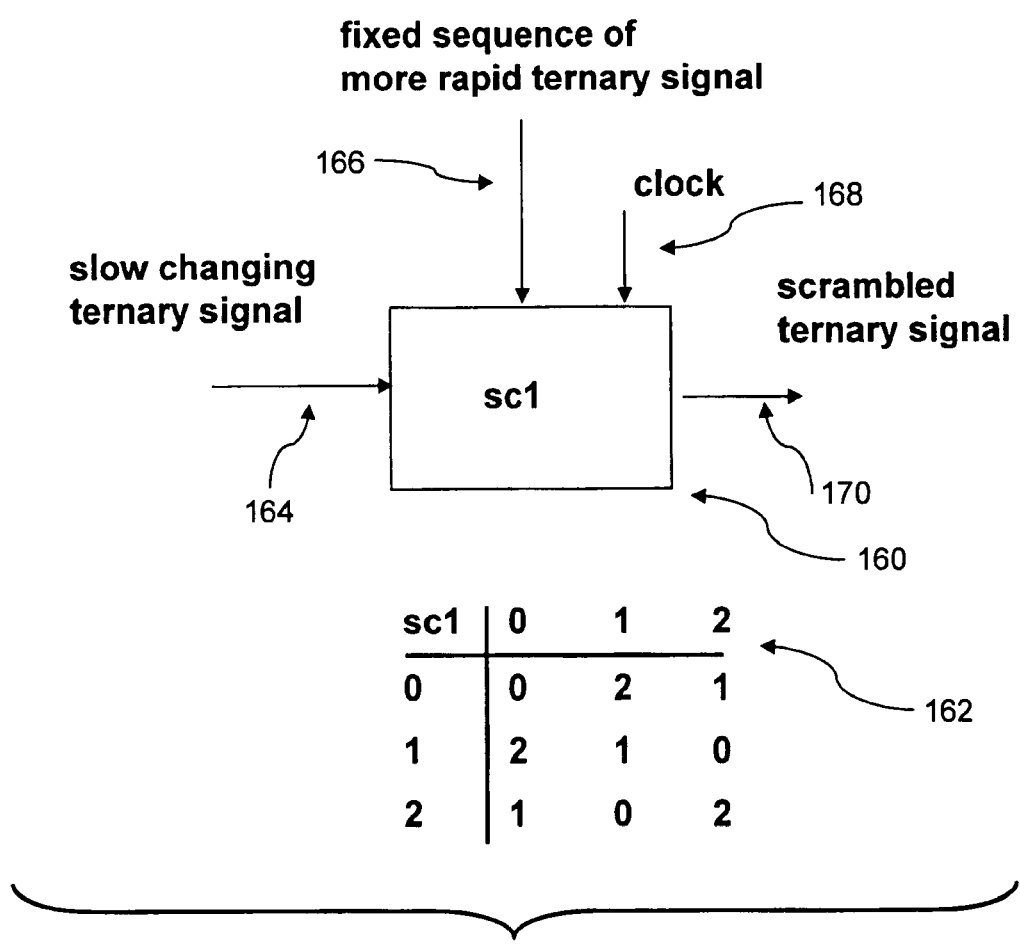
FIG. 14 is a block diagram showing an embodiment of the present invention to generate a spread spectrum ternary signal sequence from which the original ternary signal can be recovered by ternary scrambling of the coded sequence with the original pre-determined ternary sequence used to create the coded ternary sequence.

FIG. 14 illustrates a system that generates a spread spectrum ternary scrambled signal. This system can also be used to generate the scrambled signal of FIG. 13. A scrambling device 160 implements any of the ternary logic functions previously discussed, for example, with respect to FIG. 6. One of the available ternary logic functions that the device 160 can implement is illustrated in the truth table 162. As previously discussed, a slow changing ternary signal that is to be scrambled or spread is input at 164 to the device 160. A fixed sequence of more rapidly changing ternary signals is input at 166 to the device 160. A clock 168 synchronizes the process. A scrambled ternary signal is output at 170 of the device 160.

This spread spectrum or scrambling device can also be used with higher multi-value signals. In this case, a higher, multi-value function, such as those previously discussed with respect to FIG. 10, is used.

Figure 15:
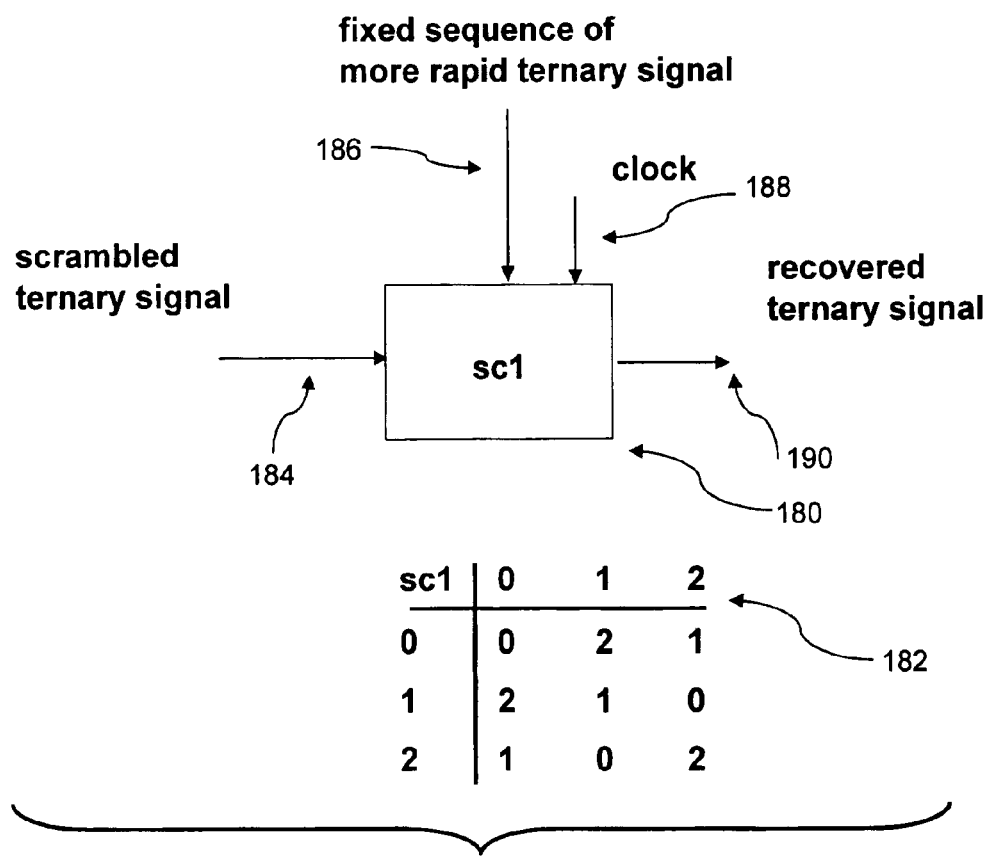
FIG. 15 is a block diagram showing an embodiment of the present invention that recover the original ternary signal from a spread spectrum ternary signal sequence.

FIG. 15 illustrates a system that can recover a signal from a spread spectrum ternary scrambled signal. A descrambling device 180 implements one of the ternary logic functions previously discussed. In this case, the logic function 182 is implemented, although any of the previously described ternary logic functions, for example, those described in FIG. 6, can also be implemented. The same ternary logic function used to scramble the signal is used to descramble the signal.

The scrambled ternary signal is input at 184 to the device 180. The known, pre-determined fixed sequence of more rapidly changing ternary signals in input at 186 to the device 180. A clock is input at 188 to the device 180. A descrambled ternary signal is provided at the output 190 of the device 180.

Figure 16:
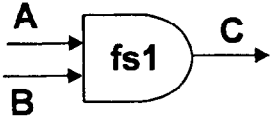
FIG. 16 is a diagram showing a 4-value scrambling and descrambling realization of the present invention.
Figure 16:
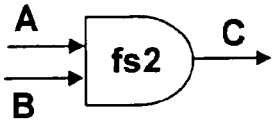
Figure 16:
Figure 16:

FIG. 16 illustrates four logic functions—fs1, fs2, fs3, and fs4—that can be used when processing four-state signals. Each of these functions can be created using the steps described with respect to FIG. 12. Further, each of these functions must satisfy the following equations: (1) A fc B=C; (2) C fc B=A and (3) A fc C=B, as previously discussed. Each of these functions can be used in any of the scrambling, descrambling or spread spectrum technologies described herein. For example, each of the functions can be used in the circuits of FIGS. 10 and 11.

Figure 17:
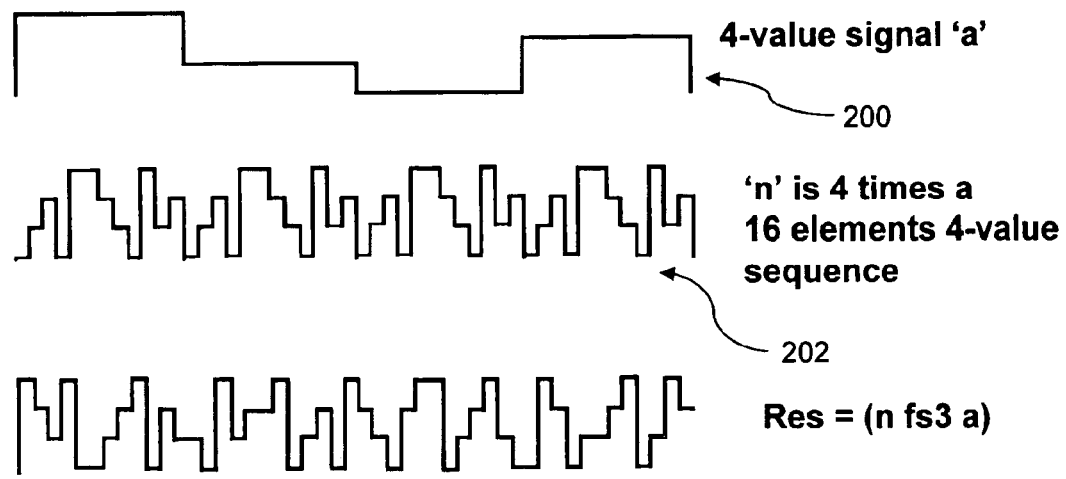
FIG. 17 is a block diagram showing an embodiment of the present invention to generate a spread spectrum 4-value signal sequence from which the original 4-value signal can be recovered by 4-value scrambling of the coded sequence with the original pre-determined 4-value sequence used to create the coded 4-value sequence.

The scrambling procedure for a ternary signal, as described with respect to FIGS. 13 and 14, can also be applied to higher, multi-value signals. FIG. 17 illustrates the application of the scrambling procedure to scramble a four-state signal. The ternary signal at line 200 is to be scrambled. The signal sequence is 3 1 0 2, and is provided to one input of a logic device. The known, pre-determined sequence that is applied to the other input of the logic device is illustrated on line 202. That sequence is 0 1 2 0 3 3 2 1 0 3 1 2. For spread spectrum applications, it is preferred that the known, pre-determined sequence have a higher frequency than the signal to be scrambled, as is illustrated in FIG. 13.

A logic table illustrated at 204 is used in the example illustrated in FIG. 17 to scramble the signal. Thus, the logic device that the signal at line 200 and the signal at line 202 are applied to a logic device that implements a logic function defined by the logic table 204. The scrambled signal can be recovered by applying the scrambled signal and the known, pre-determined sequence to a device that implements the same multi-value logic function that was used in the scrambling procedure. In FIG. 17, the known sequence on line 202 has a clock speed of 12 times the signal to be scrambled and spread on line 200.

Figure 18:
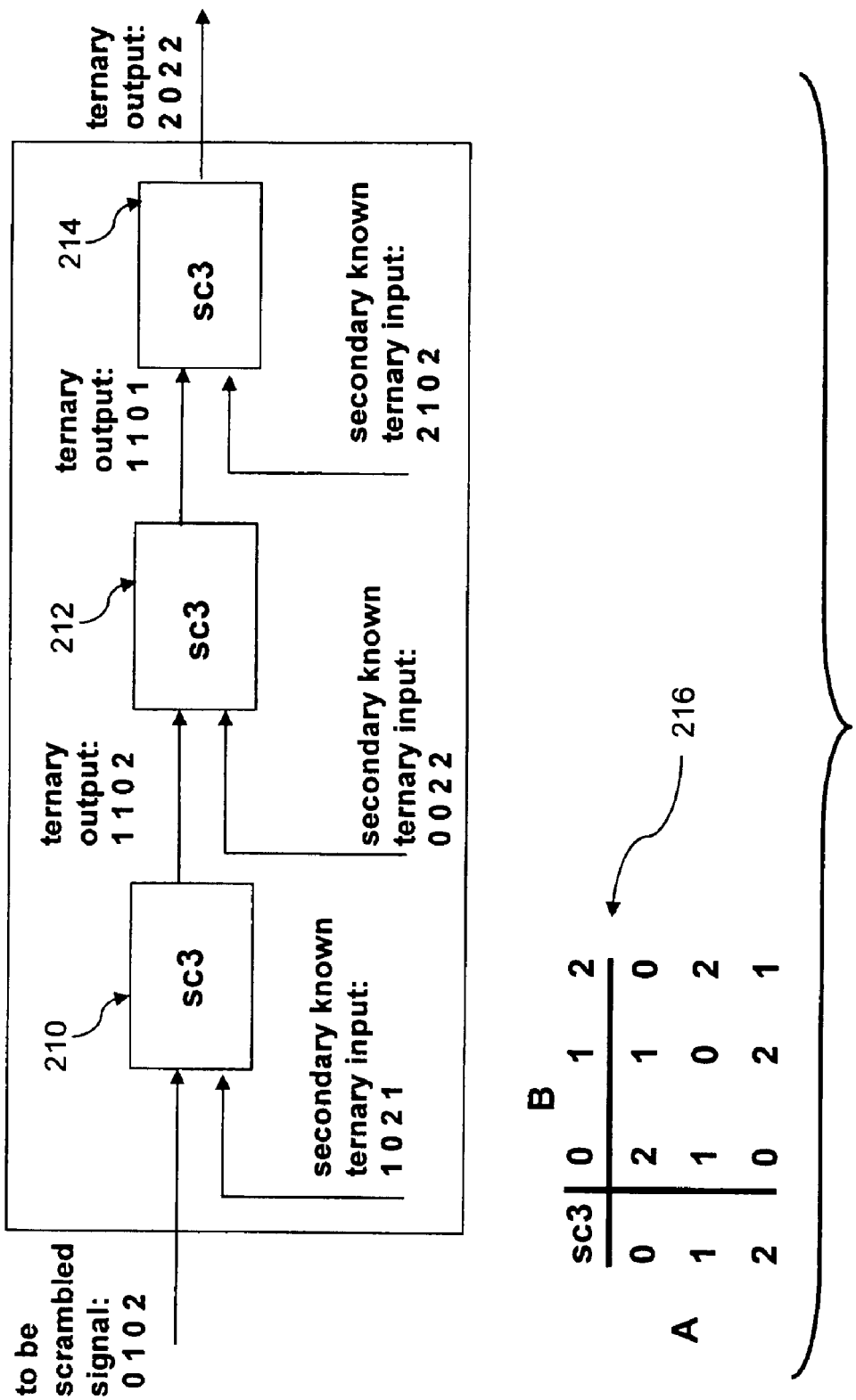
FIG. 18 is a block diagram of a composite ternary scrambling and descrambling system consisting of an odd number (3) of consecutive individual ternary scrambling devices, with each of these individual devices having a known secondary ternary signal as input. The first individual ternary scrambling device has also the to be scrambled ternary signal as input. The other ternary scrambling devices have the output of the preceding scrambling device as primary input. The output of the last scrambling device of scrambling devices is the output of the composite ternary scrambling system. If the number of scrambling devices is odd, the shown composite scrambling system also acts as the descrambling system, thus recovering the original ternary input.

FIG. 18 illustrates another ternary scrambling system. The system has an odd number of individual scramblers 210, 212 and 214. The inputs to first scrambler 210 are provided with the signal to be scrambled and with a first known ternary input. The inputs to the second scrambler 212 are provided with the output from the first scrambler 210 and with a second known ternary input. The inputs to the third scrambler 214 are provided with the output from the second scrambler 214 and with a third known ternary input. Each of the scramblers 210, 212 and 214 implements one of the ternary logic functions previously discussed. In the example of FIG. 18, the logic function that is implemented is shown in logic table 216. Note that any of the previously discussed logic functions can be used. Further, the scramblers can implement different ternary logic functions. The scrambled signals can be descrambled with a descrambler that uses the same logic devices that implement the same logic functions and having the same known, pre-determined sequences as inputs.

It is noted that this ternary scrambling method is not an extension of the binary scrambling method. Binary scrambling is basically a Modulo-2 arithmetical operation. Considering Modulo-3 addition, it is clear that addition of 2 ternary numbers is not the same as Modulo-3 subtraction. So ternary signals, scrambled with Modulo-3 addition cannot be recovered by again applying Modulo-3 addition.

It is an object of the present invention to provide one or more composite ternary scrambling methods that consist of a ternary shift register, taps in designated cells of the ternary shift register that connect to ternary scrambling functions and that will establish a self synchronizing ternary scrambler method that will create a scrambled ternary digit sequence that can be descrambled to its original ternary sequence.

It is another object of the present invention to provide a m-value (with m being an integer greater than 3) scrambling function or method with two m-value inputs A and B (with A and B having values that can be represented by integers 0, 1, 2, . . . , m-1) and a m-value output C (having one of the same values as possible for A and B). The method is such that m-value inputs A and B generate an m-value output C. The additional property of the method is that if the m-value inputs are C and A the m-value output is B and if the m-value inputs are C and B the output is m-value A.

It is another object of the present invention to provide one or more composite m-value scrambling methods that consist of a m-value shift register, taps in designated cells of the m-value shift register that connect to m-value scrambling functions and that will establish a self synchronizing m-value scrambler method that will create a scrambled m-value digit sequence that can be descrambled to its original m-value sequence.

It is another object of the present invention to provide a method to create a ternary Direct Sequence Spread Spectrum sequence from an initial ternary digital signal by applying a second, longer ternary sequence and applying the ternary scrambling method to the initial and the secondary ternary digital sequences.

It is another object of the present invention to provide a method to recover the initial ternary sequence from a scrambled Direct Sequence Spread Spectrum sequence by applying the ternary scrambling function to the second, longer ternary sequence and the ternary Direct Sequence Spread Spectrum sequence.

Another novel application is the creation of higher value scrambling functions.

Another novel application is the creation of 4-value or higher value coded signals such as applicable in spread spectrum coding and as shown in FIG. 17. The 4-value coded spread spectrum signal can be recovered by again applying the 4-value scrambling method on the coded signal with the pre-determined 4-value sequence with which the original signal was coded.

It is another object of the present invention to provide a method to create a m-value Direct Sequence Spread Spectrum sequence from an initial m-value digital signal by applying a second, longer m-value sequence and applying the m-value scrambling method to the initial and the secondary m-value digital sequences.

It is another object of the present invention to provide a method to recover the initial m-value sequence from a scrambled Direct Sequence Spread Spectrum sequence by applying the m-value scrambling function to the second, longer m-value sequence and the m-value Direct Sequence Spread Spectrum sequence.

It is another object of the present invention to increase the security of scrambling a ternary digital signal by applying an odd number of consecutive scrambling stages of which the secondary input is a known ternary signal and the input to the first ternary scrambler is the to be scrambled ternary signal and the primary input to the consecutive ternary scramblers is the output of the preceding ternary scrambler as shown in FIG. 18.

It is another object of the invention to provide a recovery or descrambling system of the signal scrambled by a system like or similar to the ternary scrambling system as shown in FIG. 18. which is the system as shown in FIG. 18. Only ternary scrambling systems like shown in FIG. 18. with an odd number of scrambling stages can act as their own descramblers.

It is another object of the present invention to increase the security of scrambling an m-value (with m and integer greater than 3) digital signal by applying an odd number of consecutive m-value scrambling stages of which the secondary input is a known m-value signal and the input to the first m-value scrambler is the to be scrambled m-value signal and the primary input to the consecutive m-value scramblers is the output of the preceding m-value scrambler.

It is another object of the invention to provide a recovery or descrambling system of the signal scrambled by an m-value scrambling system comprised of an odd number of consecutive m-value scramblers with known m-value inputs. Such an m-value descrambling system is the system which created the scrambled m-value signal, only if that scrambling system consists of an odd number of m-value scramblers.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific applications illustrated.

U.S. patent application Ser. No. 10/912,954, filed on Aug. 6, 2004 is hereby incorporated by reference in its entirety into the present patent application. Further, U.S. Provisional Patent Application, No. 60/501,335 filed Sep. 9, 2003 is hereby incorporated by reference in its entirety into this present Patent Application.

With respect to the descriptions and drawings of the invention then, it is to be realized that the application, formatting, selection, configuration, implementation and realization of the scrambler functions depend upon their application and are deemed readily apparent to one skilled in the art, and all equivalent relationships to those illustrated in the drawings and described in this document are intended to be encompassed by the present invention.

Therefore, the foregoing is considered as illustrative only of the principles of the invention. Further, since numerous modifications and changes will readily occur to those skilled in the art, it is not desired to limit the invention to the exact configurations and operation shown and described, and accordingly, all suitable modifications and equivalents may be resorted to, falling within the scope of the invention.

What is claimed is:

1. A method of scrambling an unknown ternary signal with a known ternary signal, the known and unknown ternary signals being able to assume one of three states, comprising:

inputting the unknown ternary signal to a first input of a scrambling ternary logic device;

inputting the known ternary signal to a second input of the scrambling ternary logic device;

the scrambling ternary logic device implementing a ternary logic function, sc, that satisfies the following equations:
(1) A sc B=C, where A is the unknown signal, B is the known ternary signal and C is the output from the ternary logic device;
(2) C sc B=A, if C and B were input to the ternary logic device; and
(3) A sc C=B; if A and C were input to the ternary logic device; and outputting a scrambled ternary signal from an output of the scrambling ternary logic device.

2. The method as claimed in claim 1, wherein the ternary logic function, sc, is defined by the following truth table:

|     | In2 |   |   |
|-----|-----|---|---|
| In1 | 0   | 1 | 2 |
| 0   | 0   | 2 | 1 |
| 1   | 2   | 1 | 0 |
| 2   | 1   | 0 | 2.|

3. The method as claimed in claim 1, wherein the ternary logic function, sc, is defined by the following truth table:

|     | In2 |   |   |
|-----|-----|---|---|
| In1 | 0   | 1 | 2 |
| 0   | 1   | 0 | 2 |
| 1   | 0   | 2 | 1 |
| 2   | 2   | 1 | 0.|

4. The method as claimed in claim 1, wherein the ternary logic function, sc, is defined by the following truth table:

|     | In2 |   |   |
|-----|-----|---|---|
| In1 | 0   | 1 | 2 |
| 0   | 2   | 1 | 0 |
| 1   | 1   | 0 | 2 |
| 2   | 0   | 2 | 1.|

5. The method as claimed in claim 1, comprising:

inputting the scrambled ternary signal to a first input of a descrambling ternary logic device;

inputting the known ternary signal to a second input of the descrambling ternary logic device;

the descrambling ternary logic device implementing a ternary logic function, sc; and outputting the unknown ternary signal on an output of the descrambling ternary logic device.

6. The method as claimed in claim 5, wherein the ternary logic function, sc, is defined by the following truth table:

|     | In2 |   |   |
|-----|-----|---|---|
| In1 | 0   | 1 | 2 |
| 0   | 0   | 2 | 1 |
| 1   | 2   | 1 | 0 |
| 2   | 1   | 0 | 2.|

7. The method as claimed in claim 5, wherein the ternary logic function, sc, is defined by the following truth table:

|     | In2 |   |   |
|-----|-----|---|---|
| In1 | 0   | 1 | 2 |
| 0   | 1   | 0 | 2 |
| 1   | 0   | 2 | 1 |
| 2   | 2   | 1 | 0.|

8. The method as claimed in claim 5, wherein the ternary logic function, sc, is defined by the following truth table:

|     | In2 |   |   |
|-----|-----|---|---|
| In1 | 0   | 1 | 2 |
| 0   | 2   | 1 | 0 |
| 1   | 1   | 0 | 2 |
| 2   | 0   | 2 | 1.|

9. Apparatus for scrambling an unknown ternary signal with a known ternary signal, the unknown and known ternary signals being able to assume one of three states, comprising:

a scrambling ternary logic device having a first input, a second input and an output:

the unknown ternary signal being connected to the first input of the scrambling ternary logic device;

the known ternary signal being connected to the second input of the scrambling ternary logic device;

the scrambling ternary logic device implementing a ternary logic function, sc, that satisfies the following equations:
(1) A sc B=C, where A is the unknown signal, B is the known ternary signal and C is the output from the ternary logic device;
(2) C sc B=A, if C and B were input to the ternary logic device; and
(3) A sc C=B; if A and C were input to the ternary logic device;

whereby a scrambled ternary signal is provided on the output of the scrambling ternary logic device.

10. The apparatus as claimed in claim 9, wherein the ternary logic function, sc, is defined by the following truth table:

|     | In2 |   |   |
| --- | --- | --- | --- |
| In1 | 0   | 1 | 2 |
| 0   | 0   | 2 | 1 |
| 1   | 2   | 1 | 0 |
| 2   | 1   | 0 | 2. |

11. The apparatus as claimed in claim 9, wherein the ternary logic function, sc, is defined by the following truth table:

|     | In2 |   |   |
| --- | --- | --- | --- |
| In1 | 0   | 1 | 2 |
| 0   | 1   | 0 | 2 |
| 1   | 0   | 2 | 1 |
| 2   | 2   | 1 | 0. |

12. The apparatus as claimed in claim 9, wherein the ternary logic function, sc, is defined by the following truth table:

|     | In2 |   |   |
| --- | --- | --- | --- |
| In1 | 0   | 1 | 2 |
| 0   | 2   | 1 | 0 |
| 1   | 1   | 0 | 2 |
| 2   | 0   | 2 | 1. |

13. The apparatus as claimed in claim 9, comprising:

a descrambling ternary logic device having a first input, a second input and an output;

the scrambled ternary signal being connected to the first input of the descrambling ternary logic device;

the known ternary signal being connected to the second input of the descrambling ternary logic device;

the descrambling ternary logic device implementing a ternary logic function, sc; and the unknown ternary signal being provided on the output of the descrambling ternary logic device.

14. The apparatus as claimed in claim 13, wherein the ternary logic faction, sc, is defined by the following truth table:

|     | In2 |   |   |
| --- | --- | --- | --- |
| In1 | 0   | 1 | 2 |
| 0   | 0   | 2 | 1 |
| 1   | 2   | 1 | 0 |
| 2   | 1   | 0 | 2. |

15. The apparatus as claimed in claim 13, wherein the ternary logic function, sc, is defined by the following truth table:

|     | In2 |   |   |
| --- | --- | --- | --- |
| In1 | 0   | 1 | 2 |
| 0   | 1   | 0 | 2 |
| 1   | 0   | 2 | 1 |
| 2   | 2   | 1 | 0. |

16. The apparatus as claimed in claim 13, wherein the ternary logic function, sc, is defined by the following truth table:

|     | In2 |   |   |
| --- | --- | --- | --- |
| In1 | 0   | 1 | 2 |
| 0   | 2   | 1 | 0 |
| 1   | 1   | 0 | 2 |
| 2   | 0   | 2 | 1. |

17. A method of scrambling an unknown x-value signal with a known x-value signal, the known and unknown x-value signals being able to assume one of x states, wherein x is greater than or equal to 3, comprising:

inputting the unknown x-value signal to a first input of a scrambling x-value logic device;

inputting the known x-value signal to a second input of the scrambling x-value logic device;

the scrambling x-value logic device implementing a x-value logic function, fc, that satisfies the following equations:

(1) A fc B=C, where A is the unknown signal, B is the known x-value signal and C is the output from the x-value logic device;

(2) C fc B=A, if C and B were input to the x-value logic device; and (3) A fc C=B; if A and C were input to the x-value logic device; and outputting a scrambled x-value signal from an output of the scrambling x-value logic device.

18. The method as claimed in claim 17, wherein the x-value signal can assume one of four values, and the x-value logic function, fc, is defined by the following truth table:

|     | In2 |   |   |   |
| --- | --- | --- | --- | --- |
| In1 | 0   | 1 | 2 | 3 |
| 0   | 0   | 3 | 2 | 1 |
| 1   | 3   | 2 | 1 | 0 |
| 2   | 2   | 1 | 0 | 3 |
| 3   | 1   | 0 | 3 | 2. |

19. The method is claimed in claim 17, wherein the x-value signal can assume one of four values, and the x-value logic function, fc, is defined by the following truth table:

|     | In2 |   |   |   |
| --- | --- | - | - | - |
| In1 | 0 | 1 | 2 | 3 |
| 0 | 1 | 0 | 3 | 2 |
| 1 | 0 | 3 | 2 | 1 |
| 2 | 3 | 2 | 1 | 0 |
| 3 | 2 | 1 | 0 | 3. |

20. The method as claimed in claim 17, wherein the x-value signal can assume one of four values, and the x-value logic function, fc, is defined by the following truth table:

|     | In2 |   |   |   |
| --- | --- | - | - | - |
| In1 | 0 | 1 | 2 | 3 |
| 0 | 2 | 1 | 0 | 3 |
| 1 | 1 | 0 | 3 | 2 |
| 2 | 0 | 3 | 2 | 1 |
| 3 | 3 | 2 | 1 | 0. |

21. The method as claimed in claim 17, wherein the x-value signal can assume one of four values, and the x-value logic function, fc, is defined by the following truth table:

|     | In2 |   |   |   |
| --- | --- | - | - | - |
| In1 | 0 | 1 | 2 | 3 |
| 0 | 3 | 2 | 1 | 0 |
| 1 | 2 | 1 | 0 | 3 |
| 2 | 1 | 0 | 3 | 2 |
| 3 | 0 | 3 | 2 | 1. |

22. The method as claimed in claim 17, wherein the x-value signal can assume one of n values, and the x-value logic function, fc, is defined by the truth table set forth below or by a truth table derived therefrom by continually moving the row n-1 to row 0 and moving rows 0 to n-2 down one row:

|     | In2 |   |   |   |   |   |   |   |
| --- | --- | - | - | - | - | - | - | - |
| In1 | 0 | 1 | 2 | 3 | ... | ... | n-2 | n-1 |
| 0 | 0 | n-1 | n-2 | ... | ... | ... | 2 | 1 |
| 1 | n-1 | n-2 | n-3 | ... | ... | ... | 1 | 0 |
| 2 | n-2 | n-3 | n-4 | ... | ... | ... | 0 | n-1 |
| ... | ... | ... | ... | ... | ... | ... | ... | ... |
| ... | ... | ... | ... | ... | ... | ... | ... | ... |
| n-2 | 2 | 1 | 0 | ... | ... | ... | 4 | 3 |
| n-1 | 1 | 0 | n-1 | ... | ... | ... | 3 | 2. |

23. The method as claimed in claim 17, comprising:
inputting the scrambled x-value signal to a first input of a descrambling x-value logic device;
inputting the known x-value signal to a second input of the descrambling x-value logic device;
the descrambling x-value logic device implementing a x-value logic function, fc; and
outputting the unknown x-value signal on an output of the descrambling x-value logic device.

24. The method as claimed in claim 23, wherein the x-value signal can assume one of four values, and the x-value logic function, fc, is defined by the following truth table:

|     | In2 |   |   |   |
| --- | --- | - | - | - |
| In1 | 0 | 1 | 2 | 3 |
| 0 | 0 | 3 | 2 | 1 |
| 1 | 3 | 2 | 1 | 0 |
| 2 | 2 | 1 | 0 | 3 |
| 3 | 1 | 0 | 3 | 2. |

25. The method as claimed in claim 23, wherein the x-value signal can assume one of four values, and the x-value logic function, fc, is defined by the following truth table:

|     | In2 |   |   |   |
| --- | --- | - | - | - |
| In1 | 0 | 1 | 2 | 3 |
| 0 | 1 | 0 | 3 | 2 |
| 1 | 0 | 3 | 2 | 1 |
| 2 | 3 | 2 | 1 | 0 |
| 3 | 2 | 1 | 0 | 3. |

26. The method as claimed in claim 23, wherein the x-value signal can assume one of four values, and the x-value logic function, fc, is defined by the following truth table:

|     | In2 |   |   |   |
| --- | --- | - | - | - |
| In1 | 0 | 1 | 2 | 3 |
| 0 | 2 | 1 | 0 | 3 |
| 1 | 1 | 0 | 3 | 2 |
| 2 | 0 | 3 | 2 | 1 |
| 3 | 3 | 2 | 1 | 0. |

27. The method as claimed in claim 23, wherein the x-value signal can assume one of four values, and the x-value logic function, fc, is defined by the truth table set forth below or by a truth derived there from by continually moving the row n-1 results to row 0 and moving rows 0 to n-2 down one now:

|     | In2 |   |   |   |
| --- | --- | - | - | - |
| In1 | 0 | 1 | 2 | 3 |
| 0 | 3 | 2 | 1 | 0 |
| 1 | 2 | 1 | 0 | 3 |
| 2 | 1 | 0 | 3 | 2 |
| 3 | 0 | 3 | 2 | 1. |

28. The method as claimed in claim 23, wherein the x-value signal can assume one of n values, and the x-value logic function, fc, is defined by the truth table set forth below or by a truth table derived therefrom by continually moving the row n-1 to row 0 and moving rows 0 to n-2 down one row:

|      |     |     |     |     | In2 |     |     |     |
| ---- | --- | --- | --- | --- | --- | --- | --- | --- |
| In1  | 0   | 1   | 2   | 3   | ... | ... | n-2 | n-1 |
| 0    | 0   | n-1 | n-2 | ... | ... | ... | 2   | 1   |
| 1    | n-1 | n-2 | n-3 | ... | ... | ... | 1   | 0   |
| 2    | n-2 | n-3 | n-4 | ... | ... | ... | 0   | n-1 |
| ...  | ... | ... | ... | ... | ... | ... | ... | ... |
| ...  | ... | ... | ... | ... | ... | ... | ... | ... |
| ...  | ... | ... | ... | ... | ... | ... | ... | ... |
| n-2  | 2   | 1   | 0   | ... | ... | ... | 4   | 3   |
| n-1  | 1   | 0   | n-1 | ... | ... | ... | 3   | 2.  |

29. Apparatus for scrambling an unknown x-value signal with a known x-value signal, the unknown and known x-value signals being able to assume one of x states, comprising:
  a scrambling x-value logic device having a first input, a second input and an output:
  the unknown x-value signal being connected to the first input of the scrambling x-value logic device;
  the known x-value signal being connected to the second input of the scrambling x-value logic device;
  the scrambling x-value logic device implementing a x-value logic function, fc, that satisfies the following equations:
    (1) A fc B=C, where A is the unknown signal, B is the known x-value signal and C is the output from the x-value logic device;
    (2) C fc B=A, if C and B were input to the x-value logic device; and
    (3) A fc C=B; if A and C were input to the x-value logic device;
  whereby a scrambled x-value signal is provided on the output of the scrambling x-value logic device.

30. The apparatus as claimed in claim 28, wherein the x-value signal can assume one of four values, and the x-value logic function, fc, is defined by the following truth table:

|     |     | In2 |     |     |
| --- | --- | --- | --- | --- |
| In1 | 0   | 1   | 2   | 3   |
| 0   | 0   | 3   | 2   | 1   |
| 1   | 3   | 2   | 1   | 0   |
| 2   | 2   | 1   | 0   | 3   |
| 3   | 1   | 0   | 3   | 2.  |

31. The apparatus as claimed in claim 28, wherein the x-value signal can assume one of four values, and the x-value logic faction, fc, is defined by the following truth table:

|     |     | In2 |     |     |
| --- | --- | --- | --- | --- |
| In1 | 0   | 1   | 2   | 3   |
| 0   | 1   | 0   | 3   | 2   |
| 1   | 0   | 3   | 2   | 1   |
| 2   | 3   | 2   | 1   | 0   |
| 3   | 2   | 1   | 0   | 3.  |

32. The apparatus as claimed in claim 28, wherein the x-value signal can assume one of four values, and the x-value logic function, fc, is defined by the following truth table:

|     |     | In2 |     |     |
| --- | --- | --- | --- | --- |
| In1 | 0   | 1   | 2   | 3   |
| 0   | 2   | 1   | 0   | 3   |
| 1   | 1   | 0   | 3   | 2   |
| 2   | 0   | 3   | 2   | 1   |
| 3   | 3   | 2   | 1   | 0.  |

33. The apparatus as claimed in claim 28, wherein the x-value signal can assume one of four values, and the x-value logic function, fc, is defined by the following truth table:

|     |     | In2 |     |     |
| --- | --- | --- | --- | --- |
| In1 | 0   | 1   | 2   | 3   |
| 0   | 3   | 2   | 1   | 0   |
| 1   | 2   | 1   | 0   | 3   |
| 2   | 1   | 0   | 3   | 2   |
| 3   | 0   | 3   | 2   | 1.  |

34. The apparatus as claimed in claim 28, wherein the x-value signal can assume one of n values, and the x-value logic function, fc, is defined by the truth table set forth below or by a truth table derived therefrom by continually moving the row n-1 to row 0 and moving rows 0 to n-2 down one row:

|      |     |     |     |     | In2 |     |     |     |
| ---- | --- | --- | --- | --- | --- | --- | --- | --- |
| In1  | 0   | 1   | 2   | 3   | ... | ... | n-2 | n-1 |
| 0    | 0   | n-1 | n-2 | ... | ... | ... | 2   | 1   |
| 1    | n-1 | n-2 | n-3 | ... | ... | ... | 1   | 0   |
| 2    | n-2 | n-3 | n-4 | ... | ... | ... | 0   | n-1 |
| ...  | ... | ... | ... | ... | ... | ... | ... | ... |
| ...  | ... | ... | ... | ... | ... | ... | ... | ... |
| ...  | ... | ... | ... | ... | ... | ... | ... | ... |
| n-2  | 2   | 1   | 0   | ... | ... | ... | 4   | 3   |
| n-1  | 1   | 0   | n-1 | ... | ... | ... | 3   | 2.  |

35. The apparatus as claimed in claim 28, comprising:
  a descrambling x-value logic device having a first input, a second input and an output;
  the scrambled x-value signal being input to the first input of the descrambling x-value logic device;
  the unknown x-value signal being input to the second input of the descrambling x-value logic device;

the descrambling x-value logic device implementing a x-value logic function, sc; and outputting the unknown x-value signal on the output of the descrambling x-value logic device.

36. The apparatus as claimed in claim 35, wherein the x-value signal can assume one of four values, and the x-value logic function, fc, is defined by the following truth table:

|     | In2 |   |   |   |
| --- | --- | --- | --- | --- |
| In1 | 0 | 1 | 2 | 3 |
| 0 | 0 | 3 | 2 | 1 |
| 1 | 3 | 2 | 1 | 0 |
| 2 | 2 | 1 | 0 | 3 |
| 3 | 1 | 0 | 3 | 2. |

37. The apparatus as claimed in claim 35, wherein the x-value signal can assume one of four values, and the x-value logic function, fc, is defined by the following truth table:

|     | In2 |   |   |   |
| --- | --- | --- | --- | --- |
| In1 | 0 | 1 | 2 | 3 |
| 0 | 1 | 0 | 3 | 2 |
| 1 | 0 | 3 | 2 | 1 |
| 2 | 3 | 2 | 1 | 0 |
| 3 | 2 | 1 | 0 | 3. |

38. The apparatus as claimed in claim 35, wherein the x-value signal can assume one of four values, and the x-value logic function, fc, is defined by the following truth table:

|     | In2 |   |   |   |
| --- | --- | --- | --- | --- |
| In1 | 0 | 1 | 2 | 3 |
| 0 | 2 | 1 | 0 | 3 |
| 1 | 1 | 0 | 3 | 2 |
| 2 | 0 | 3 | 2 | 1 |
| 3 | 3 | 2 | 1 | 0. |

39. The apparatus as claimed in claim 35, wherein the x-value signal can assume one of four values, and the x-value logic function, fc, is defined by the following truth table:

|     | In2 |   |   |   |
| --- | --- | --- | --- | --- |
| In1 | 0 | 1 | 2 | 3 |
| 0 | 3 | 2 | 1 | 0 |
| 1 | 2 | 1 | 0 | 3 |
| 2 | 1 | 0 | 3 | 2 |
| 3 | 0 | 3 | 2 | 1. |

40. The apparatus as claimed in claim 35, wherein the x-value signal can assume one of n values, and the x-value logic function, fc, is defined by the truth table set forth below or by a truth derived therefrom by continually moving the row n-1 to row 0 and moving rows 0 to n-2 down one row:

|     | In2 |   |   |   |   |   |   |   |
| --- | --- | --- | --- | --- | --- | --- | --- | --- |
| In1 | 0 | 1 | 2 | 3 | ... | ... | n-2 | n-1 |
| 0 | 0 | n-1 | n-2 | ... | ... | ... | 2 | 1 |
| 1 | n-1 | n-2 | n-3 | ... | ... | ... | 1 | 0 |
| 2 | n-2 | n-3 | n-4 | ... | ... | ... | 0 | n-1 |
| ... | ... | ... | ... | ... | ... | ... | ... | ... |
| ... | ... | ... | ... | ... | ... | ... | ... | ... |
| n-2 | 2 | 1 | 0 | ... | ... | ... | 4 | 3 |
| n-1 | 1 | 0 | n-1 | ... | ... | ... | 3 | 2. |

41. A method of scrambling an unknown x-value signal, the unknown x-value signal being able to assume one of x states, x being greater than or equal to 3, comprising:

inputting the unknown x-value signal to a first input of a first scrambling x-value logic device and a first known x-value signal to a second input of the first scrambling x-value logic device;

inputting an output from the first scrambling x-value logic device to a first input of a second scrambling logic device and a second known x-value signal to a second input of the second scrambling x-value logic device;

inputting an output from the second scrambling x-value logic device to a first input of a third scrambling logic device and a second known x-value signal to a second input of the third scrambling x-value logic device;

the first, second and third scrambling x-value logic device implementing a x-value logic function, fc, that satisfies the following equations:

(1) A fc B=C, where A is the signal on the first input of the device, B is the second input of the device and C is the output from the device;

(2) C fc B=A, if C and B were input to the device; and (3) A fc C=B; if A and C were input to the device; and outputting a scrambled x-value signal on an output of the third scrambling x-value logic device.

42. The method as claimed in claim 41 wherein the first known x-value signal, the second known x-value signal and the third known x-value signal have different values.

43. The method as claimed in claim 41, wherein the x-value signal can assume one of n values, and the x-value logic function, fc, is defined by the truth table set forth below or by a truth table derived therefrom by continually moving the row n-1 to row 0 and moving rows 0 to n-2 down one row:

|     | In2 |   |   |   |   |   |   |   |
| --- | --- | --- | --- | --- | --- | --- | --- | --- |
| In1 | 0 | 1 | 2 | 3 | ... | ... | n-2 | n-1 |
| 0 | 0 | n-1 | n-2 | ... | ... | ... | 2 | 1 |
| 1 | n-1 | n-2 | n-3 | ... | ... | ... | 1 | 0 |
| 2 | n-2 | n-3 | n-4 | ... | ... | ... | 0 | n-1 |
| ... | ... | ... | ... | ... | ... | ... | ... | ... |
| ... | ... | ... | ... | ... | ... | ... | ... | ... |
| n-2 | 2 | 1 | 0 | ... | ... | ... | 4 | 3 |
| n-1 | 1 | 0 | n-1 | ... | ... | ... | 3 | 2. |

44. The method as claimed in claim 41, further comprising:

inputting the scrambled x-value signal to a first input of a first descrambling x-value logic device and the first known x-value signal to a second input of the first descrambling x-value logic device;

inputting an output from the first scrambling x-value logic device to a first input of a second descrambling logic device and a second known x-value signal to a second input of the second descrambling x-value logic device;

inputting an output from the second descrambling x-value logic device to a first input of a third descrambling logic device and a second known x-value signal to a second input of the third descrambling x-value logic device;

the first, second and third descrambling x-value logic devices implementing a x-value logic function, fc, that satisfies the following equations:

(1) A sc B=C, where A is the signal on the first input of the device, B is the second input of the device and C is the output from the device;

(2) C sc B=A, if C and B were input to the device; and (3) A sc C=B; if A and C were input to the device; and outputting the unknown x-value signal on an output of the third descrambling x-value logic device.

45. Apparatus for scrambling an unknown x-value signal, the unknown x-value signal being able to assume one of x states, x being greater than or equal to 3, comprising:

a first scrambling x-value logic device having a first input, a second input and an output, a second scrambling x-value logic device having a first input, a second input and an output, a third scrambling x-value logic device having a first input, a second input and an output, wherein the unknown x-value signal is connected to the first input of the first scrambling x-value logic device, a first known x-value signal is connected to the second input of the first scrambling x-value logic device, the output from the first scrambling x-value logic device is connected to the first input of the second scrambling logic device, a second known x-value signal is connected to the second input of the second scrambling x-value logic device, the output from the second scrambling x-value logic device is connected to the first input of the third scrambling logic device and a third known x-value signal is connected to the second input of the third scrambling x-value logic device;

the first, second and third scrambling x-value logic device implementing a x-value logic function, fc, that satisfies the following equations:

(1) A sc B=C, where A is the signal on the first input of the device, B is the second input of the device and C is the output from the device;

(2) C sc B=A, if C and B were input to the device; and (3) A sc C=B; if A and C were input to the device; and wherein a scrambled x-value signal is provided on the output of the third scrambling x-value logic device.

46. The apparatus as claimed in claim 45 wherein the first known x-value signal, the second known x-value signal and the third known x-value signal have different values.

47. The apparatus as claimed in claim 45, wherein the x-value signal can assume one of n values, and the x-value logic function, fc, is defined by the truth table derived there from by continually moving the row n-1 results to row 0 and moving rows 0 to n-2 down one now:

| | In2 | | | | | | | |
|---|---|---|---|---|---|---|---|---|
| In1 | 0 | 1 | 2 | 3 | ... | ... | n-2 | n-1 |
| 0 | 0 | n-1 | n-2 | ... | ... | ... | 2 | 1 |
| 1 | n-1 | n-2 | n-3 | ... | ... | ... | 1 | 0 |
| 2 | n-2 | n-3 | n-4 | ... | ... | ... | 0 | n-1 |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| n-2 | 2 | 1 | 0 | ... | ... | ... | 4 | 3 |
| n-1 | 1 | 0 | n-1 | ... | ... | ... | 3 | 2. |

48. Apparatus as claimed in claim 45, further comprising:

a first descrambling x-value logic device having a first input, a second input and an output, a second descrambling x-value logic device having a first input, a second input and an output, a third descrambling x-value logic device having a first input, a second input and an output, wherein the scrambled x-value signal is connected to the first input of the first descrambling x-value logic device, a first known x-value signal is connected to the second input of the first descrambling x-value logic device, the output from the first descrambling x-value logic device is connected to the first input of the second descrambling logic device, a second known x-value signal is connected to the second input of the second descrambling x-value logic device, the output from the second descrambling x-value logic device is connected to the first input of the third descrambling logic device and a third known x-value signal is connected to the second input of the third descrambling x-value logic device;

the first, second and third descrambling x-value logic devices implementing a x-value logic function, fc, that satisfies the following equations:

(1) A sc B=C, where A is the signal on the first input of the device, B is the second input of the device and C is the output from the device;

(2) C sc B=A, if C and B were input to the device; and (3) A sc C=B; if A and C were input to the device; and wherein the unknown x-value signal is provided on the output of the third descrambling x-value logic device.

49. A method of scrambling an unknown x-value signal, the unknown x-value signal being able to assume one of x states, x being greater than or equal to 3, comprising:

inputting the unknown x-value signal to a first set of serially connected odd number of x-value logic devices;

inputting one or more known x-value signals to the first set of serially connected odd number of x-value logic devices;

each of the odd number of x-value logic devices implementing a x-value logic function that satisfies the following equations:

(1) A fc B=C, where A is the signal on the first input of the device, B is the second input of the device and C is the output from the device;

(2) C fc B=A, if C and B were input to the device; and (3) A fc C=B; if A and C were input to the device; and outputting a scrambled x-value signal on an output.

50. A method as claimed in claim 49, comprising:

inputting the scrambled x-value signal to a second set of serially connected odd number of x-value logic devices;

inputting one of more known x-value signals to the second set of serially connected odd number of x-value logic devices;

the second set of serially connected odd number of x-value logic devices being the same as the first set of serially connected odd number of x-value logic devices; and outputting the unknown signal on a second output.

* * * * *